(12) United States Patent
Arakane

(10) Patent No.: US 12,454,138 B2
(45) Date of Patent: Oct. 28, 2025

(54) RECORDING DEVICE

(71) Applicant: BROTHER KOGYO KABUSHIKI KAISHA, Nagoya (JP)

(72) Inventor: Satoru Arakane, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 283 days.

(21) Appl. No.: 18/325,273

(22) Filed: May 30, 2023

(65) Prior Publication Data

US 2023/0382129 A1    Nov. 30, 2023

(30) Foreign Application Priority Data

May 30, 2022   (JP) ................................ 2022-087381

(51) Int. Cl.
  *B41J 2/21*   (2006.01)
  *B41J 2/045*  (2006.01)
  *G06F 3/12*   (2006.01)

(52) U.S. Cl.
  CPC ......... *B41J 2/2139* (2013.01); *B41J 2/04568* (2013.01); *B41J 2/04586* (2013.01); *B41J 2/2135* (2013.01); *G06F 3/1208* (2013.01); *G06F 3/1239* (2013.01); *G06F 3/1255* (2013.01); *G06F 3/1256* (2013.01)

(58) Field of Classification Search
  CPC ............... B41J 2/16579; B41J 2/16517; B41J 2002/16591; B41J 2/16508; B41J 2002/1657; B41J 2002/16573; G06F 3/1208; G06F 3/1239; G06F 3/1255; G06F 3/1256

See application file for complete search history.

(56) References Cited

U.S. PATENT DOCUMENTS

| | | |
|---|---|---|
| 2004/0119766 A1 | 6/2004 | Shibata et al. |
| 2004/0252148 A1 | 12/2004 | Shibata et al. |
| 2006/0125860 A1 | 6/2006 | Arazaki |
| 2006/0192803 A1 | 8/2006 | Tanaka |
| 2007/0139461 A1 | 6/2007 | Izuo |

(Continued)

FOREIGN PATENT DOCUMENTS

| | | |
|---|---|---|
| JP | 2004042646 A | 2/2004 |
| JP | 2004058284 A | 2/2004 |

(Continued)

*Primary Examiner* — Thinh H Nguyen
(74) *Attorney, Agent, or Firm* — Scully, Scott, Murphy & Presser, PC

(57) ABSTRACT

A recording device includes a head including a plurality of nozzles that are arranged at predetermined intervals in a first direction, the plurality of nozzles being configured to eject liquid, and a controller. The controller is configured to, in a case where the number of the abnormal nozzles among the plurality of nozzles is equal to or greater than the predetermined number and the number of the abnormal nozzles, among a part of the plurality of nozzles in which an interval in the first direction is a preset interval longer than the predetermined interval, is less than the predetermined number, cause the head to eject liquid from the part of nozzles to record an image with a resolution in which a resolution in the first direction is lower than a resolution corresponding to the predetermined interval.

15 Claims, 21 Drawing Sheets

(56) References Cited

U.S. PATENT DOCUMENTS

| | | |
|---|---|---|
| 2008/0068411 A1 | 3/2008 | Koase |
| 2008/0211850 A1 | 9/2008 | Miyamoto et al. |
| 2014/0300657 A1 | 10/2014 | Ike |
| 2016/0214421 A1* | 7/2016 | Furuya .................... B41J 29/38 |

FOREIGN PATENT DOCUMENTS

| | | | |
|---|---|---|---|
| JP | 2005007613 | A | 1/2005 |
| JP | 2006192880 | A | 7/2006 |
| JP | 2006347176 | A | 12/2006 |
| JP | 2007152889 | A | 6/2007 |
| JP | 2007320110 | A | 12/2007 |
| JP | 2008168592 | A | 7/2008 |
| JP | 2014200982 | A | 10/2014 |
| JP | 2014205257 | A | 10/2014 |

* cited by examiner

RECORDING DEVICE

REFERENCE TO RELATED APPLICATIONS

This application claims priority from Japanese Patent Application No. 2022-087381 filed on May 30, 2022. The entire content of the priority application is incorporated herein by reference.

BACKGROUND ART

As a recording device configured to eject liquid from nozzles to perform recording, a printer configured to eject ink from nozzles to perform recording is disclosed in a related art. The printer of the related art includes two heads each having a plurality of nozzles arranged in a direction perpendicular to a sheet conveying direction. In addition, between the two heads, positions, in the sheet conveying direction, of the nozzles are shifted by a length of half an interval between the nozzles in each head. As a result, in the printer of the related art, it is possible to record an image in which a resolution in the direction orthogonal to the sheet conveying direction is a resolution corresponding to the length of half the interval between the nozzles of each head.

DESCRIPTION

Here, in the printer of the related art, any one of the plurality of nozzles of the two heads may be clogged due to contamination of foreign matter, increase in viscosity of ink, or the like, which may cause an abnormal nozzle that cannot eject ink. In a case where an image is recorded in this state, a dot corresponding to the abnormal nozzle is not formed, and a white streak, which is a portion exposed due to a dot corresponding to the abnormal nozzle of a recording sheet is not formed, is generated in the recorded image, which leads to a decrease in image quality.

In such a case, it is considered that by increasing an amount of ink ejected from the nozzles corresponding to a dot adjacent to the abnormal nozzle to increase a size of the dot, a portion, which becomes the white streak, of the recording sheet is filled with the dot whose size is increased, and the deterioration of the image quality can be reduced. However, in this case, since only the amount of ink ejected from the nozzles adjacent to the abnormal nozzle is increased, control becomes complicated. In addition, in the image recorded in this manner, the image quality of the portion where the size of the dot is increased is partially lowered, and the deterioration of the image quality is easily noticeable.

An object of the present disclosure is to provide a recording device capable of making deterioration in image quality less noticeable with simple control in a case where there are a predetermined number or more of abnormal nozzles.

In a recording device according to the present disclosure, a head includes a plurality of nozzles that are arranged at predetermined intervals in a first direction, the plurality of nozzles being configured to eject liquid. A controller is configured to, in a case where the abnormal nozzle information indicates that the number of the abnormal nozzles among the plurality of nozzles is less than the predetermined number, perform a first recording processing of causing the head to eject liquid from the plurality of nozzles while causing the relative movement unit to move the head, with respect to the recording medium, in the second direction to record an image on the recording medium with a resolution in which a resolution in the first direction corresponds to the predetermined interval. The controller is configured to, in a case where the abnormal nozzle information indicates that the number of the abnormal nozzles among the plurality of nozzles is equal to or greater than the predetermined number and indicates that the number of the abnormal nozzles, among a part of the plurality of nozzles in which an interval in the first direction is a preset interval longer than the predetermined interval, is less than the predetermined number, perform a second recording processing of causing the head to eject liquid from the part of nozzles while causing the relative movement unit to move the head, with respect to the recording medium, in the second direction to record an image on the recording medium with a resolution in which a resolution in the first direction is lower than a resolution corresponding to the predetermined interval.

In a recording device according to the present disclosure, a head includes a plurality of first nozzles that are arranged in a first direction, the plurality of first nozzles being configured to eject liquid supplied from a first flow path connected to a liquid storage portion configured to store the liquid, and a plurality of second nozzles that are arranged in the first direction, the plurality of second nozzles being configured to eject liquid supplied from a second flow path connected to the liquid storage portion, the second flow path being different from the first flow path. A controller is configured to, in a case where the abnormal nozzle information indicates that the number of the abnormal nozzles among the plurality of first nozzles is less than the first predetermined number and the number of the abnormal nozzles among the plurality of second nozzles is less than the second predetermined number, perform a first recording processing of causing the head to eject liquid from the plurality of first nozzles and to eject liquid from the plurality of second nozzles to perform recording on the recording medium, while causing the relative movement unit to relatively move the head, with respect to the recording medium, in the second direction. The controller is configured to, in a case where the abnormal nozzle information indicates that the number of the abnormal nozzles among the plurality of first nozzles is equal to or greater than the first predetermined number and the number of the abnormal nozzles among the plurality of second nozzles is less than the second predetermined number, perform a second recording processing of causing the head not to eject liquid from the plurality of first nozzles and to eject liquid from the plurality of second nozzles to perform recording on the recording medium, while causing the relative movement unit to relatively move the head, with respect to the recording medium, in the second direction.

In the present disclosure, in a case where there are a predetermined number or more of abnormal nozzles, recording is performed by ejecting a liquid from only a part of nozzles such that the number of abnormal nozzles among nozzles used for recording is reduced, and thus it is possible to make deterioration in image quality due to not ejecting ink from the abnormal nozzle less noticeable. In addition, in this case, in order to change from a first recording process to a second recording process, the control may be changed such that the liquid is ejected from only the part of nozzles, and the control can be simplified.

FIRST EMBODIMENT

Hereinafter, a preferred first embodiment of the present disclosure will be described.

<Overall Configuration of Printer>

Figure 1:
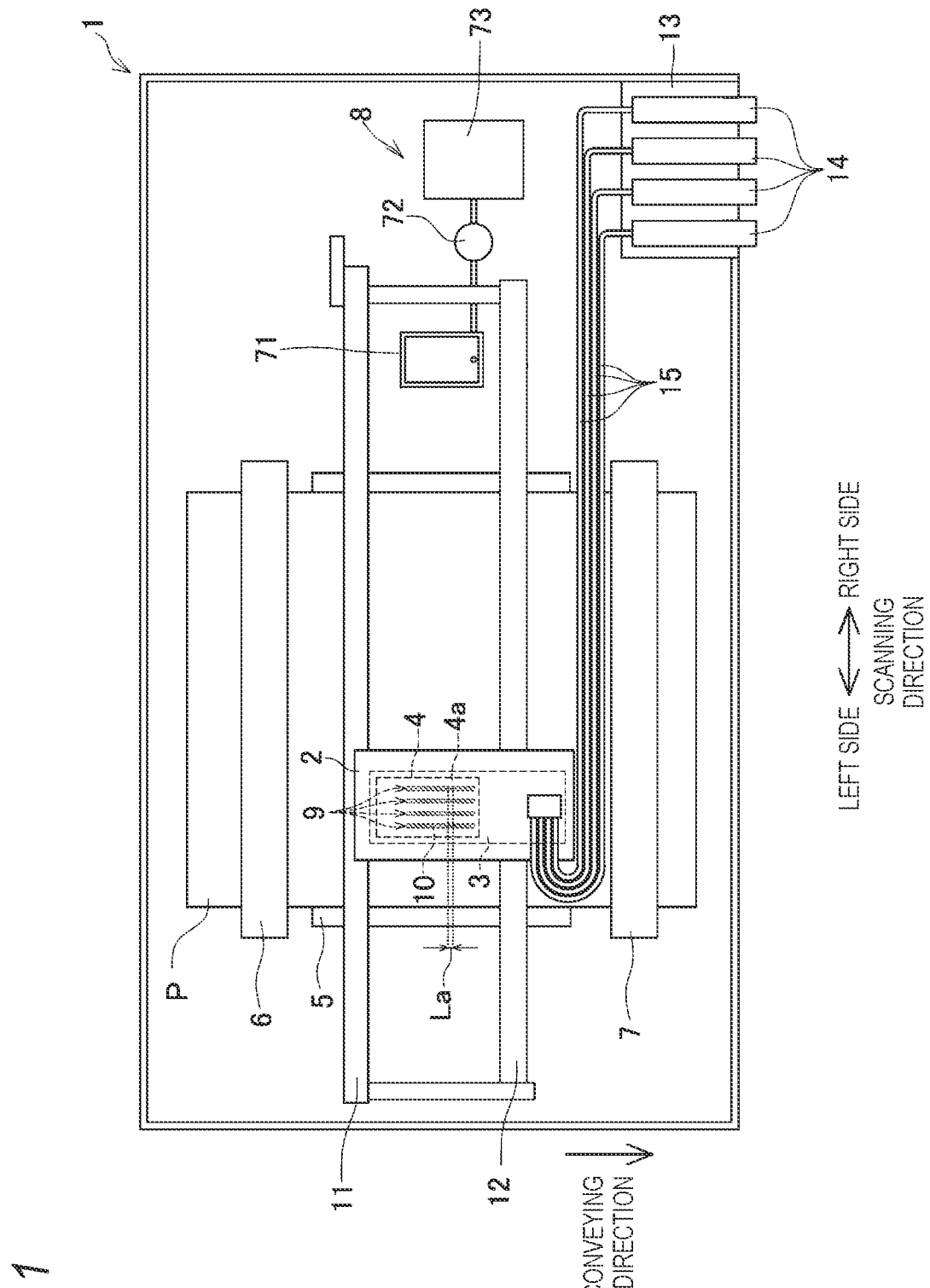
FIG. 1 is a schematic configuration diagram of a printer according to a first embodiment.

As illustrated in FIG. 1, a printer 1 ("recording device" of the present disclosure) according to the first embodiment includes a carriage 2 ("relative movement unit" of the present disclosure), a sub-tank 3, an ink jet head 4 ("head" of the present disclosure), a platen 5, conveying rollers 6 and 7, and a maintenance unit 8.

The carriage 2 is supported by two guide rails 11 and 12 extending in a scanning direction ("second direction" of the present disclosure). In the following description, a right side and a left side in the scanning direction are defined as illustrated in FIG. 1. The carriage 2 is connected to a carriage motor 86 (see FIG. 4) via a belt (not illustrated) or the like. In a case where the carriage motor 86 is driven, the carriage 2 moves in the scanning direction along the guide rails 11 and 12.

The sub-tank 3 is mounted on the carriage 2. Here, the printer 1 includes a cartridge holder 13. Four ink cartridges 14 are detachably mounted in the cartridge holder 13. The four ink cartridges 14 mounted in the cartridge holder 13 are arranged in the scanning direction, and store black ink, yellow ink, cyan ink, and magenta ink ("liquid" of the present disclosure) in order from the one positioned on the right side in the scanning direction.

The ink jet head 4 is mounted on the carriage 2 and connected to a lower end portion of the sub-tank 3. In addition, the ink jet head 4 is configured to eject ink from a plurality of nozzles 10 formed on a nozzle surface 4a as a lower surface of the ink jet head 4. More specifically, the plurality of nozzles 10 are arranged at an interval La ("predetermined interval" of the present disclosure) in a conveying direction ("first direction" of the present disclosure) orthogonal to the scanning direction to form nozzle rows 9, and four nozzle rows 9 are arranged, in the scanning direction, on the nozzle surface 4a. Positions of the nozzles 10 in the conveying direction are the same among the four nozzle rows 9. The plurality of nozzles 10 are supplied with black ink, yellow ink, cyan ink, and magenta ink from the sub-tank 3 in this order from nozzles forming a nozzle row 9 on the right side. As a result, the black ink, yellow ink, cyan ink, and magenta ink are ejected from the plurality of nozzles 10 in this order from the nozzles configuring the nozzle row 9 on the right side in the scanning direction.

In addition, the ink jet head 4 includes a plurality of individual driving elements 20 (see FIG. 4) for the plurality of nozzles 10. The driving element 20 is configured to apply ejection energy to ink in a corresponding nozzle 10. The driving element 20 is, for example, a piezoelectric actuator configured to apply pressure to ink in a pressure chamber (not illustrated) communicating with the nozzle 10. The plurality of driving elements 20 are connected to a driver IC 89 (see FIG. 4). The driver IC 89 is configured to transmit driving signals to the plurality of driving elements 20 to drive the plurality of driving elements 20.

The platen 5 is disposed below the ink jet head 4 and faces the plurality of nozzles 10. The platen 5 extends over an entire length of a recording sheet P in the scanning direction, and configured to support the recording sheet P from below. The conveying roller 6 is disposed upstream of the ink jet head 4 and the platen 5 in the conveying direction. The conveying roller 7 is disposed downstream of the ink jet head 4 and the platen 5 in the conveying direction. The conveying rollers 6 and 7 are connected to a conveying motor 87 (see FIG. 4) via gears (not illustrated). In a case where the conveying motor 87 is driven, the conveying rollers 6 and 7 rotate to convey the recording sheet P in the conveying direction.

The maintenance unit 8 includes a cap 71, a suction pump 72, and a waste liquid tank 73. The cap 71 is disposed on the right side in the scanning direction with respect to the platen 5. In a case where the carriage 2 is positioned at a maintenance position that is on the right side in the scanning direction with respect to the platen 5, the plurality of nozzles 10 face the cap 71.

Figure 4:
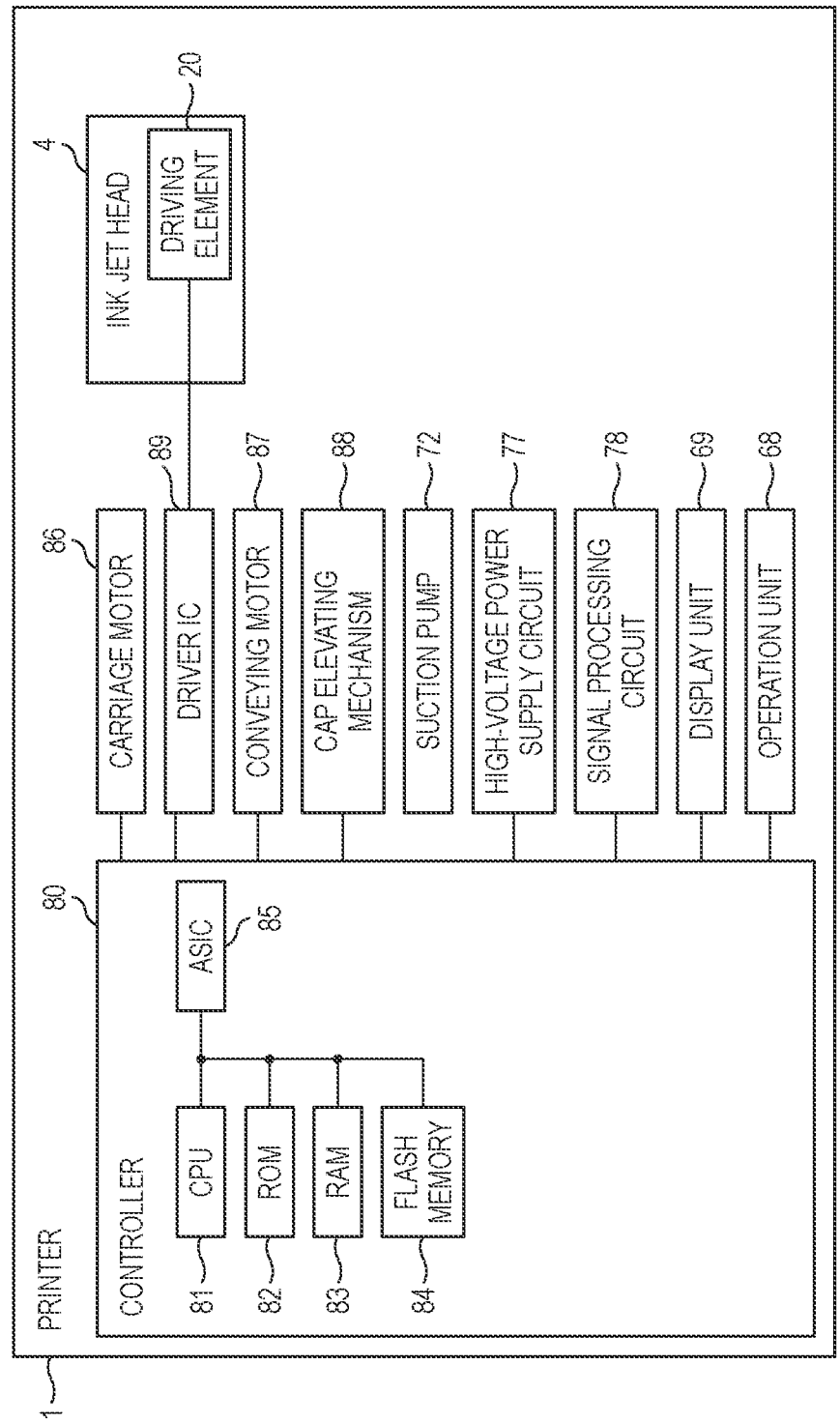
FIG. 4 is a block diagram illustrating an electrical configuration of the printer according to the first embodiment.

In addition, the cap 71 is connected to a cap elevating mechanism 88 (see FIG. 4). In a case where the cap elevating mechanism 88 is driven, the cap 71 is lifted and lowered. In a case where the cap 71 is lifted by the cap elevating mechanism 88 in a state where the plurality of nozzles 10 and the cap 71 face each other by positioning the carriage 2 at the above-mentioned maintenance position, an upper end portion of the cap 71 comes into close contact with the nozzle surface 4a. As a result, a capped state is established in which the plurality of nozzles 10 of the ink jet head 4 are covered with the cap 71. In a state where the cap 71 is lowered, the plurality of nozzles 10 are not covered with the cap 71. The cap 71 is not limited to those covering the plurality of nozzles 10 by being in close contact with the nozzle surface 4a. For example, the cap 71 may be those covering the plurality of nozzles 10 by being in close contact with a frame (not illustrated) or the like disposed around the nozzle surface 4a of the ink jet head 4.

The suction pump 72 is a tube pump or the like, and is connected to the cap 71 and the waste liquid tank 73. In the maintenance unit 8, in a case where the suction pump 72 is driven after the above-mentioned capped state is established, suction purge in which ink in the ink jet head 4 is discharged from the plurality of nozzles 10 can be performed. The ink discharged by the suction purge is stored in the waste liquid tank 73.

Here, for convenience, the cap 71 collectively covers all the nozzles 10, and the ink in the ink jet head 4 is discharged from all the nozzles 10 in the suction purge, but the present invention is not limited thereto. For example, the cap 71 may separately include a portion configured to cover the plurality of nozzles 10 configuring the nozzle row 9 on the rightmost side for ejecting black ink, and a portion configured to cover the plurality of nozzles 10 configuring three nozzle rows 9 on the left side for ejecting color ink. For example, in the suction purge, any of the black ink and the color ink in the ink jet head 4 may be selectively discharged. Alternatively, for example, the cap 71 may be individually provided for respective nozzle rows 9, and the ink may be discharged from the nozzles 10 individually for the respective nozzle rows 9 in the suction purge.

Figure 2:
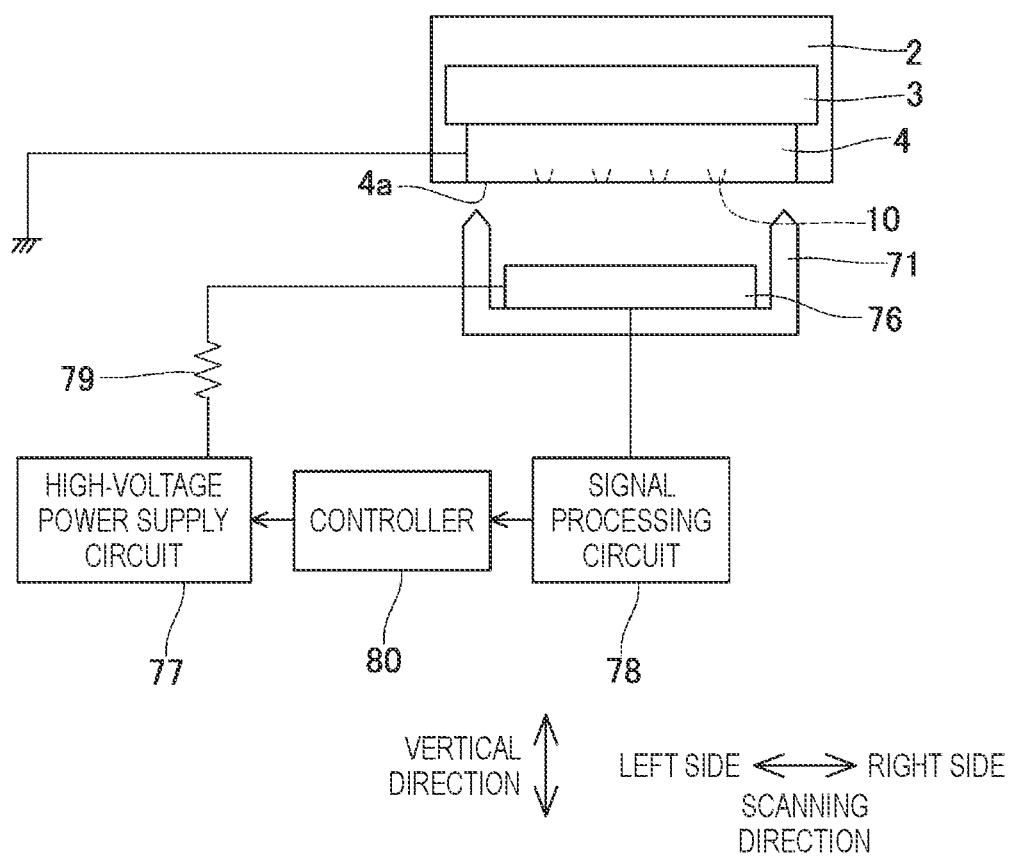
FIG. 2 is a diagram illustrating an electrode disposed in a cap, and a connection relation of the electrode with a high-voltage power supply circuit and a signal processing circuit.

As illustrated in FIG. 2, the electrodes 76 each having a rectangular planar shape are disposed in the cap 71. The electrode 76 is connected to the high-voltage power supply circuit 77 via a resistor 79. The high-voltage power supply circuit 77 is configured to apply a predetermined voltage (for example, about 600 V) to the electrode 76 in a case where the high-voltage power supply circuit 77 performs the test drive described later. On the other hand, the ink jet head 4 is maintained at ground potential. As a result, a predetermined potential difference is generated between the ink jet head 4 and the electrode 76. The signal processing circuit 78 is connected to the electrode 76. The signal processing circuit 78 includes a differentiation circuit and the like, and is configured to output a signal corresponding to a voltage of the electrode 76. However, the signal output from the signal processing circuit 78 may be a current signal.

After the above-mentioned capped state is established, in a state where a voltage is applied to the electrode 76 by the high-voltage power supply circuit 77 and the test drive described later is not performed, a voltage of the signal output from the signal processing circuit 78 is set to a voltage V0 illustrated in FIGS. 3A and 3B.

In the present embodiment, after the above-mentioned capped state is established, in a state where a voltage is applied to the electrode 76 by the high-voltage power supply circuit 77, the ink jet head 4 is configured to perform the test drive for ejecting ink from each of the plurality of nozzles 10 toward the electrode 76.

In a case where the ink is ejected from the nozzles 10 by the test drive, the ink ejected from the nozzles 10 is charged. As a result, the potential of the electrode 76 changes until the charged ink approaches the electrode 76 and the ink lands on the electrode 76. Then, after the charged ink lands on the electrode 76, the potential of the electrode 76 returns to the potential before ink ejection while being attenuated.

Figure 3A:
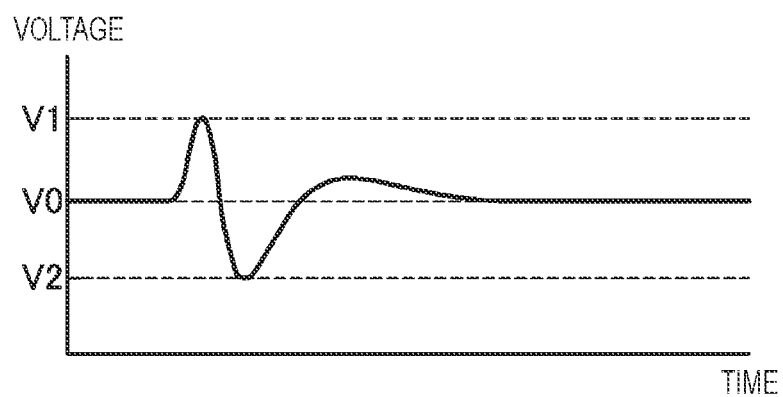
FIG. 3A is a diagram illustrating a signal output from the signal processing circuit in a case where ink is ejected from a nozzle in a test drive.

In this case, as illustrated in FIG. 3A, a voltage of the signal output from the signal processing circuit 78 is increased from the voltage V0 to a voltage V1 that is higher than the voltage V0, is reduced to a voltage V2 that is lower than the voltage V0, and thereafter, is repeatedly increased and reduced to return to the voltage V0 while being attenuated. As a result, the signal output from the signal processing circuit 78 has a maximum value of the voltage V1 and a minimum value of the voltage V2.

Figure 3B:
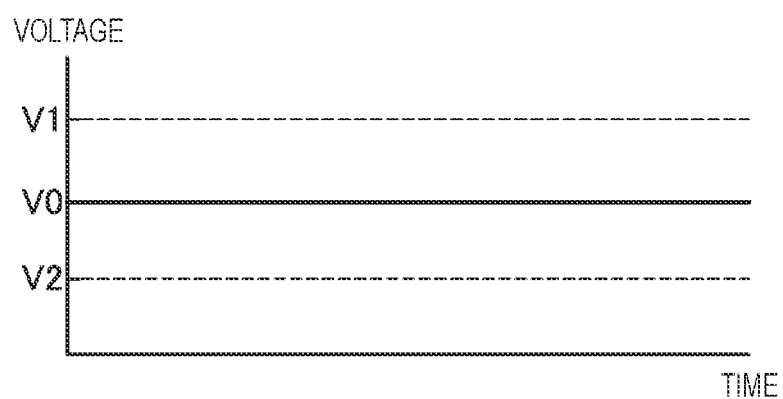
FIG. 3B is a diagram illustrating a signal output from the signal processing circuit in a case where ink is not ejected from the nozzle in the test drive.

On the other hand, in a case where the ink is not ejected from the nozzles 10 by the test drive, the signal output from the signal processing circuit 78 hardly changes from the voltage V0 as illustrated in FIG. 3B.

As described above, in the present embodiment, the signal output from the signal processing circuit 78 differs depending on whether the ink is ejected from the nozzles 10 by the test drive. By utilizing this, in the printer 1, it is possible to determine whether a nozzle 10 is an abnormal nozzle having an abnormality in the ink ejection, as will be described later. Here, in the present embodiment, a predetermined voltage is applied to the electrode 76, the ink jet head 4 is maintained at the ground potential, and the signal processing circuit 78 is configured to output a signal corresponding to the voltage of the electrode 76, but the present invention is not limited thereto. By maintaining the electrode 76 at the ground potential and applying a predetermined voltage to the ink jet head 4, a potential difference may be generated between the electrode 76 and the ink jet head 4, and the signal processing circuit 78 may be connected to the ink jet head 4 and configured to output a signal corresponding to the voltage of the ink jet head 4.

<Electrical Configuration of Printer>

Next, an electrical configuration of the printer 1 will be described. As illustrated in FIG. 4, the printer 1 includes a controller 80. The controller 80 includes a central processing unit (CPU) 81, a read only memory (ROM) 82, a random access memory (RAM) 83, a flash memory 84 ("storage unit" of the present disclosure), and an application specific integrated circuit (ASIC) 85. The controller 80 is configured to control operations of the carriage motor 86, the driver IC 89, the conveying motor 87, the cap elevating mechanism 88, the suction pump 72, the high-voltage power supply circuit 77, and the like. In the first embodiment, the controller 80 is configured to control the driver IC 89 to control the ink jet head 4. In addition, the controller 80 is configured to receive a signal from the signal processing circuit 78 or the like. As described above, the ink jet head 4 has a plurality of driving elements 20, but only one driving element 20 is illustrated in FIG. 4 for convenience.

In addition to the configuration described above, the printer 1 includes a display unit 69 and an operation unit 68. The display unit 69 is, for example, a liquid crystal display provided on a housing of the printer 1. The controller 80 is configured to control the display unit 69 to display, on the display unit 69, information necessary for an operation of the printer 1. The operation unit 68 includes buttons provided on the housing of the printer 1, a touch panel provided on the display unit 69, and the like. The operation unit 68 is configured to receive a signal based on an operation of a user and is configured to transmit the received signal to the controller 80.

The controller 80 may be a controller in which only the CPU 81 performs various processing, a controller in which only the ASIC 85 performs various processing, or a controller in which the CPU 81 and the ASIC 85 perform various processing in cooperation with each other. In addition, the controller 80 may be a controller in which one CPU 81 performs processing independently, or a controller in which a plurality of CPUs 81 perform processing in a shared manner. Further, the controller 80 may be a controller in which one ASIC 85 performs processing independently, or a controller in which a plurality of ASICs 85 perform processing in a shared manner.

<Determination of Whether Nozzle is Abnormal Nozzle>

Next, processing for determining whether each of the plurality of nozzles 10 of the ink jet head 4 is an abnormal nozzle in the printer 1 will be described. In the printer 1, the controller 80 is configured to control the carriage motor 86, the cap elevating mechanism 88, and the like to establish the capped state, and then the controller 80 is configured to cause the ink jet head 4 to perform the test drive for each of the plurality of nozzles 10 in a state where a voltage is applied to the electrode 76 by the high-voltage power supply circuit 77. Then, whether the nozzle 10 is an abnormal nozzle is determined based on a signal output from the signal processing circuit 78 in this case. Thereafter, information on whether each nozzle 10 is an abnormal nozzle is stored, in the flash memory 84, as abnormal nozzle information.

The above-mentioned processing of determining whether each nozzle 10 is an abnormal nozzle and of storing a result of the determination in the flash memory 84 is performed at an appropriate timing. For example, the above-mentioned processing may be performed at a predetermined time. Alternatively, the above-mentioned processing may be performed immediately before a flow shown in FIG. 6A to be described later is started, after a recording instruction signal for instructing recording on the recording sheet P is received. Alternatively, after the previous processing, the above-mentioned processing may be performed in a case where recording is performed on a predetermined number of sheets of recording sheet P. Alternatively, the above-mentioned processing may be performed in a case where a predetermined error occurs in the printer 1 and then the error is resolved.

<Processing During Recording>

Next, processing performed by the controller 80 in a case where the recording on the recording sheet P is performed in the printer 1 will be described.

In the printer 1, the controller 80 is configured to control the carriage motor 86 to move the carriage 2 in the scanning direction (to relatively move the ink jet head 4 in the scanning direction with respect to the recording sheet P). Then, the controller 80 is configured to repeatedly perform, based on recording data instructing ejection of ink from each nozzle 10, a recording pass in which the controller 80 cause the ink jet head 4 to eject the ink from the plurality of nozzles 10, and a conveying operation in which the controller 80 controls the conveying motor 87 to cause the conveying rollers 6 and 7 to convey the recording sheet P, in the conveying direction, by a length of the nozzle row 9. Thus, the recording on the recording sheet P can be performed. Here, in the printer 1, in a case where the controller 80 receives the recording instruction signal instructing the recording on the recording sheet P, the recording on the recording sheet P is performed. In addition, in a case where the controller 80 receives the recording instruction signal instructing the recording on the recording sheet P, the controller 80 acquires the recording data by receiving the recording data. Alternatively, in a case where the controller 80 receives the recording instruction signal, the controller 80 may generate recording data by receiving image data of an image to be recorded and generating the recording data from the image data.

Figure 5:
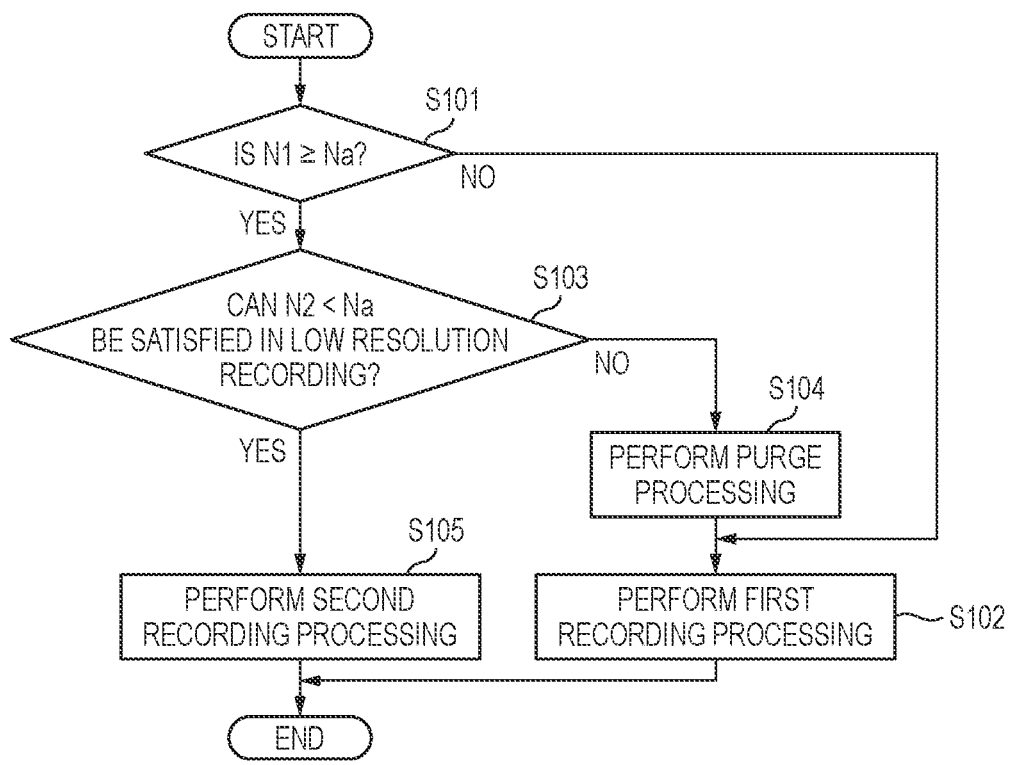
FIG. 5 is a flowchart illustrating a flow of processing in a case where recording is performed in the printer according to the first embodiment.

Further, in the printer 1, in a case where the controller 80 receives the recording instruction signal, the recording on the recording sheet P is performed by performing processing with reference to a flow shown in FIG. 5. The flow shown in FIG. 5 will be described in more detail. First, the controller 80 determines whether the number N1 of abnormal nozzles among the plurality of nozzles 10 of the ink jet head 4 is equal to or greater than a predetermined number Na, based on the abnormal nozzle information stored in the flash memory 84 (step S101). Here, the predetermined number Na may be one or two or more. In a case where the predetermined number Na is one, it is determined, in step S101, whether there is an abnormal nozzle among the plurality of nozzles 10 of the ink jet head 4.

Figure 6A:
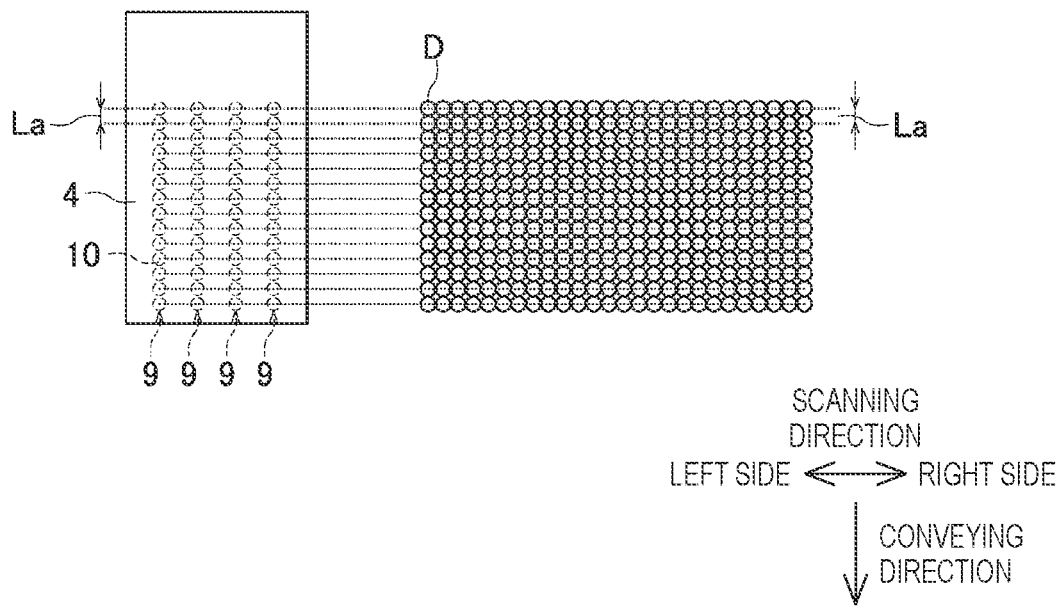
FIG. 6A is a diagram illustrating a case where the recording is performed at a resolution corresponding to a nozzle interval.

In a case where the number N1 of abnormal nozzles is less than the predetermined number Na (NO in step S101), the controller 80 performs first recording processing (step S102). In the first recording processing, the controller 80 repeatedly performs the recording pass and the conveying operation as described above to perform the recording on the recording sheet P. In addition, in a case where the recording pass is performed in the first recording processing, the controller 80 sets all of the plurality of nozzles 10 of the ink jet head 4 to be usable nozzles 10, and drives the ink jet head 4 to eject ink from the plurality of nozzles 10. As a result, in the first recording processing, as illustrated in FIG. 6A, an interval in the conveying direction of dots D formed in one recording pass is the same as the interval La of the nozzles 10 in the nozzle rows 9. That is, in the first recording processing, in each recording pass, the image is recorded on the recording sheet P with a resolution (for example, 1,200 dpi) in which the resolution in the conveying direction corresponds to the interval La. In addition, in the first embodiment, the recording sheet P is conveyed, by the length of the nozzle row 9 in the conveying direction, by the conveying operation. As a result, in the first embodiment, the resolution in the conveying direction of the image recorded in the first recording processing is also the resolution (for example, 1,200 dpi) corresponding to the interval La.

When the number N1 of abnormal nozzles is equal to or greater than the predetermined number Na (YES in step S101), the controller 80 determines whether the number N2 of abnormal nozzles, among the nozzles 10 set to be usable can be less than the predetermined number Na by performing recording with a low resolution set in advance (step S103).

More specifically, in the first embodiment, a low resolution lower than the resolution in which the resolution, in the conveying direction, corresponds to the interval La is set in advance, and information of the low resolution is stored in the flash memory 84, as information of low resolution recording.

Figure 6B:
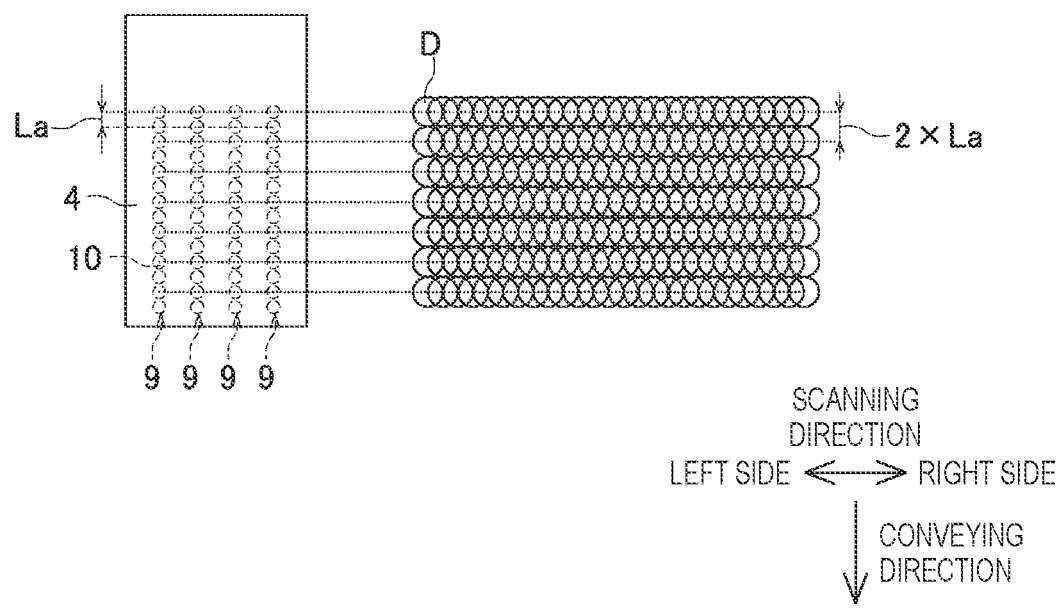
FIG. 6B is a diagram illustrating a case where recording is performed at a resolution that is half of the resolution in FIG. 6A.

In the first embodiment, as the information of the low resolution recording, for example, information indicating that the recording is performed by setting only every other nozzle 10, among the plurality of nozzles 10 forming the nozzle rows 9 as illustrated in FIG. 6B, to be usable is stored in the flash memory 84. In this case, among a plurality of dots D formed in a case where the recording is performed by the first recording processing, dots D other than every other dot D in the conveying direction are thinned out. As a result, the interval, in the conveying direction, of the dots D formed in one recording pass is twice the interval La (2×La). That is, in a case where the recording is performed as illustrated in FIG. 6B, in each recording pass, an image is recorded, on the recording sheet P, with a resolution (for example, 600 dpi) in which the resolution in the conveying direction is half a resolution in the case where the recording is performed by the first recording processing.

Figure 6C:
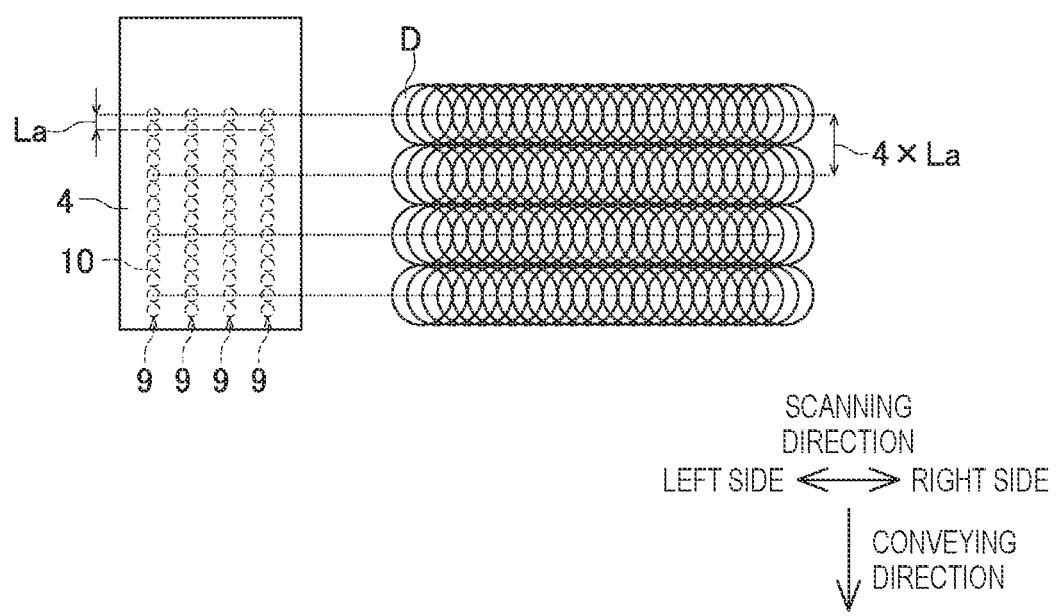
FIG. 6C is a diagram illustrating a case where recording is performed at a resolution that is quarter of the resolution in FIG. 6A.

In addition, in the first embodiment, as the information of the low resolution recording, for example, information indicating that the recording is performed by setting only every three nozzles 10, among the plurality of nozzles 10 forming the nozzle rows 9 as illustrated in FIG. 6C, to be usable is stored in the flash memory 84. In this case, among the plurality of dots D formed in a case where the recording is performed by the first recording processing, dots D other than every three dots D in the conveying direction are thinned out. As a result, the interval, in the conveying direction, of the dots D formed in one recording pass is four times the interval La (4×La). That is, in a case where the recording is performed as illustrated in FIG. 6C, in each recording pass, an image is recorded, on the recording sheet P, with a resolution (for example, 300 dpi) in which the resolution in the conveying direction is one quarter of a resolution in the case where the recording is performed by the first recording processing.

The information of the low resolution recording is not limited to the information indicating the recording with the resolutions illustrated in FIGS. 6B and 6C, and may be information indicating recording with a different resolution. In addition, the stored information of the low resolution recording is not limited to two types, and may be one type or three or more types.

In step S103, it is determined whether the number N2 of abnormal nozzles can be less than the predetermined number Na by performing the recording with the low resolution indicated by the information of the low resolution recording. Here, in a case where whether the number N2 of abnormal nozzles can be less than the predetermined number Na is determined by performing the recording with the resolution illustrated in FIG. 6B, it is determined not only whether the number N2 of abnormal nozzles can be less than the predetermined number Na by setting every other nozzle 10 illustrated in FIG. 6B to be usable, but also whether the number N2 of abnormal nozzles can be less than the predetermined number Na by setting any every other nozzle 10 other than those described above to be usable. In addition, in a case where whether the number N2 of abnormal nozzles can be less than the predetermined number Na is determined by performing the recording with the resolution illustrated in FIG. 6C, it is determined not only whether the number N2 of abnormal nozzles can be less than the predetermined number Na by setting every three nozzles 10 illustrated in FIG. 6C to be usable, but also whether the number N2 of abnormal nozzles can be less than the predetermined number Na by setting any every three nozzles 10 other than those described above to be usable.

In a case where the number N2 of abnormal nozzles cannot be less than the predetermined number Na even in a case where the recording is performed with the low resolution as described above (NO in step S103), the controller 80 performs a purge processing (step S104) and then performs the first recording processing (S102). In the purge processing of step S104, the controller 80 is configured to control the suction pump 72 and the like to perform the above-described suction purge.

In a case where the number N2 of abnormal nozzles can be less than the predetermined number Na by performing the recording with a low resolution as described above (YES in step S103), the controller 80 is configured to perform a second recording processing (step S105). In the second recording processing, the controller 80 is configured to repeatedly perform the recording pass and the conveying operation, as described above, to perform the recording on the recording sheet P. In addition, in a case where the recording pass is performed in the second recording processing, the controller 80 is configured to set only a part of the plurality of nozzles 10 of the ink jet head 4 as usable nozzles 10, and configured to drive the ink jet head 4 to eject ink from the part of the nozzles 10, thereby performing the recording such that the resolution in the conveying direction becomes the above-mentioned low resolution. Here, the part of the nozzles 10 set to be usable refers to, for example, every other nozzle 10 in the nozzle rows 9 in a case where the recording is performed with the resolution illustrated in FIG. 6B, and refers to every three nozzles 10 in the nozzle rows 9 in a case where the recording is performed with the resolution illustrated in FIG. 6C. In this case, in a case where the number N2 of abnormal nozzles can be less than the predetermined number Na even when a plurality of types of low resolutions are set in advance and the recording is performed with any of two or more types of low resolutions, the recording is performed with the highest resolution among the two or more types of low resolutions. In addition, in a case where there are a plurality of ways to select the part of the nozzles 10 set to be usable such that the number N2 of abnormal nozzles is less than the predetermined number Na with the same low resolution, the part of the nozzles 10 set to be usable is selected such that the number N2 of abnormal nozzles is the smallest.

In the first embodiment, in the second recording processing, the recording sheet P is also conveyed, by the length of the nozzle row 9, in the conveying direction by the conveying operation. As a result, in a case where the image is recorded on the recording sheet P, in each recording pass, with the resolution illustrated in FIG. 6B, the resolution, in the conveying direction, of the recorded image is half the resolution in the case where the recording is performed by the first recording processing. In addition, in a case where the image is recorded on the recording sheet P, in each recording pass, with the resolution illustrated in FIG. 6C, the resolution, in the conveying direction, of the recorded image is one quarter of the resolution in the case where the recording is performed by the first recording processing.

As illustrated in FIGS. 6A to 6C, in the second recording processing, the controller 80 is configured to increase, compared to the first recording processing, the amount of ink ejected from the nozzles 10 in the recording pass to increase a size of the dots D. In addition, in a case where a plurality of types of low resolutions are set in advance, the controller 80 is configured to increase the amount of ink ejected from the nozzles 10 in the recording pass as the recording is performed with a lower resolution to increase the size of the dots D.

<Effects>

In the first embodiment, in a case where the number N1 of abnormal nozzles among the plurality of nozzles 10 of the ink jet head 4 is less than the predetermined number Na, it is possible to record an image with a high image quality having a resolution in which the resolution, in the conveying direction, corresponds to the interval La of the nozzles 10 in the nozzle rows 9.

On the other hand, in a case where the number N1 of abnormal nozzles among the plurality of nozzles 10 of the ink jet head 4 is equal to or greater than the predetermined number Na, and the number N2 of abnormal nozzles is less than the predetermined number Na by performing the recording with a low resolution set in advance, it is possible to record an image of which the resolution in the conveying direction is lower than the resolution corresponding to the interval La of the nozzles 10. In this case, in a case where recording is switched from the recording with the resolution corresponding to the interval La of the nozzles 10 to the recording with the low resolution, it is only necessary to change the control such that the ink is ejected from only a part of the plurality of nozzles 10 of the ink jet head 4, and thus the control by the controller 80 can be simplified. In addition, in this case, the image quality of the recorded image is uniformly lowered as the resolution in the conveying direction is lowered. Therefore, as compared with a case where the image quality of the recorded image is partially lowered by performing the recording without lowering the resolution in the conveying direction and not ejecting the ink from the abnormal nozzles, the degradation in image quality can be made less noticeable.

In the first embodiment, in a case where the recording is performed with a lower resolution, an area of a region where dots are not formed in the recorded image is reduced by increasing the amount of ink ejected from the nozzles 10 to increase the size of the dots.

In the present disclosure, the expression of "causing the head to eject a liquid from the plurality of nozzles while causing the relative movement unit to move the head with respect to the recording medium in the second direction, thereby recording an image, on the recording medium, with a resolution in which a resolution in the first direction corresponds to the predetermined interval" means that, for example, the resolution, in the first direction, in one recording pass is the resolution corresponding to the interval (predetermined interval) in the first direction of the plurality of nozzles in the head. In other words, the expression means that the interval, in the first direction, of the plurality of dots formed by a first recording pass is the interval (predetermined interval), in the first direction, of the plurality of nozzles in the head. In this case, the resolution, in the first direction, of the image finally recorded may be the resolution corresponding to the predetermined interval or may be another resolution.

In addition, in the present disclosure, the expression of "causing the head to eject a liquid from the part of nozzles while causing the relative movement unit to move the head, with respect to the recording medium, in the second direction, thereby recording an image, on the recording medium, with a resolution in which the resolution in the first direction is lower than the resolution corresponding to the predetermined interval" means that, for example, the resolution in the first direction in one recording pass is the resolution corresponding to the interval (interval longer than the predetermined interval), in the first direction, of a part of the nozzles among the plurality of nozzles of the head usable for recording. In other words, the expression means that the interval, in the first direction, of the plurality of dots formed in one recording pass is the interval (longer than the predetermined interval), in the first direction, of the part of the nozzles. In this case, the resolution, in the first direction, of the image finally recorded may be a resolution lower than the resolution corresponding to the predetermined interval, or may be another resolution such as the resolution corresponding to the predetermined interval.

Second Embodiment

Figure 7:
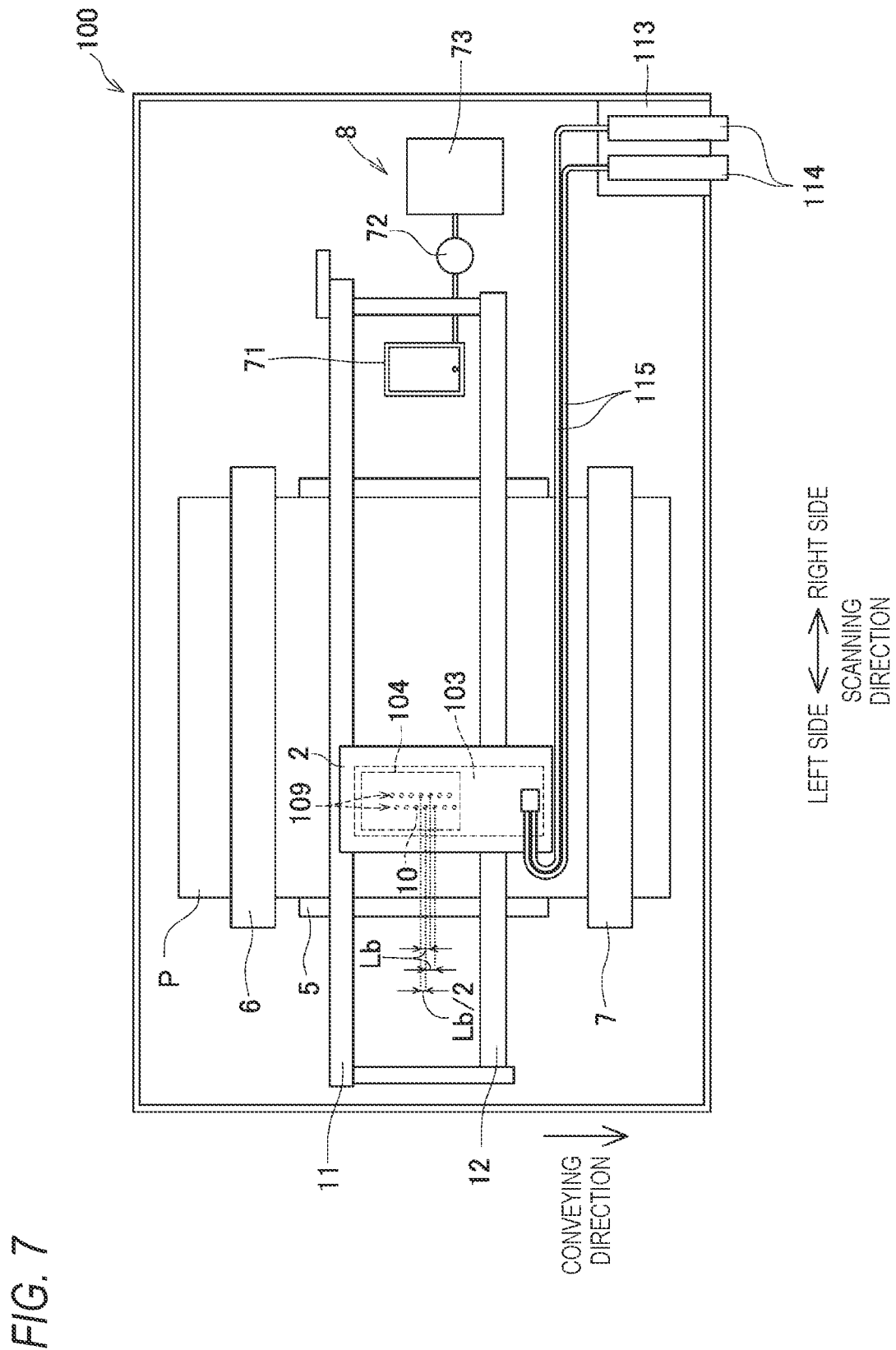
FIG. 7 is a schematic configuration diagram of a printer according to a second embodiment.
Figure 8:
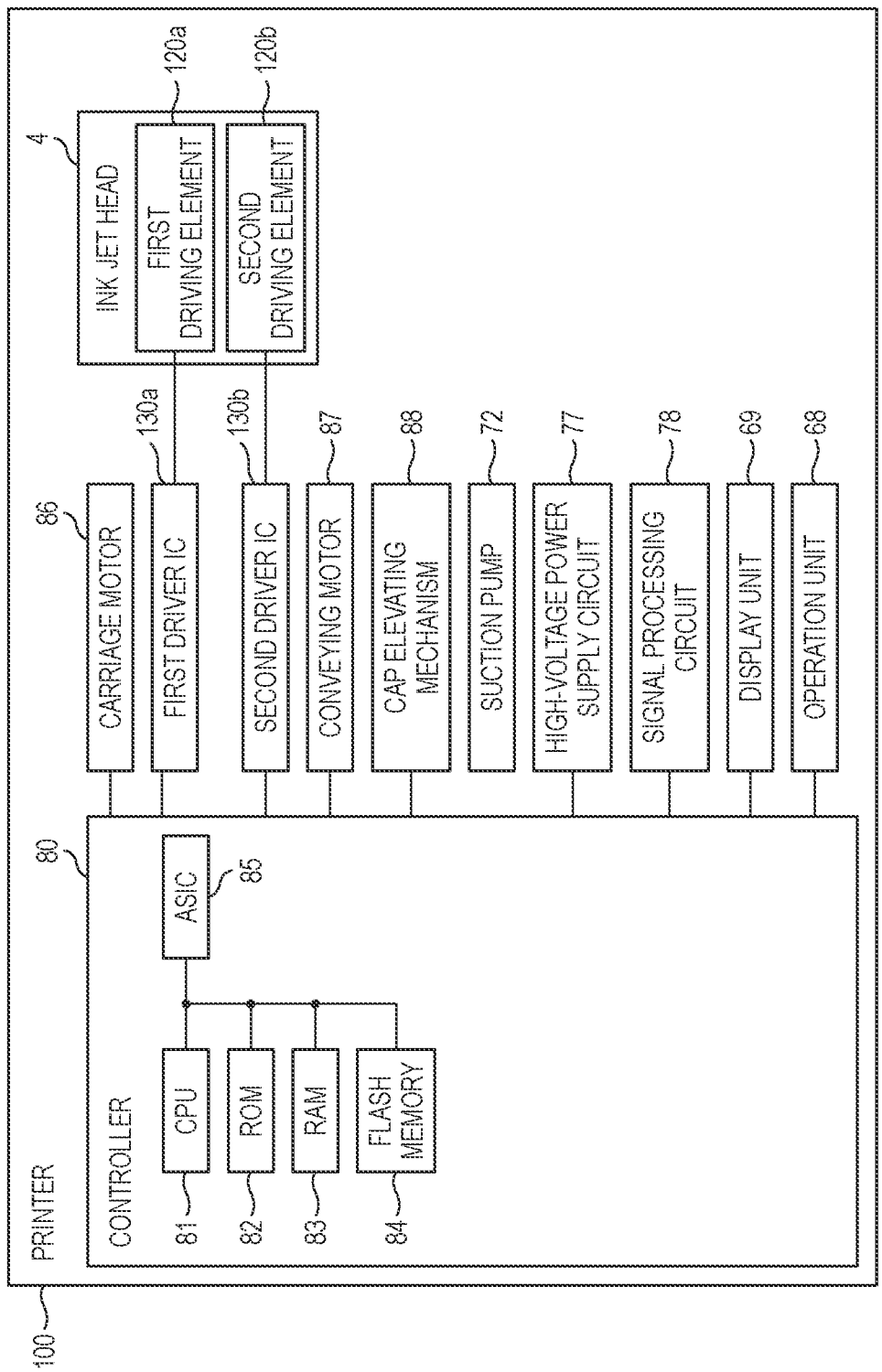
FIG. 8 is a block diagram illustrating an electrical configuration of the printer according to the second embodiment.

Next, a preferred second embodiment of the present disclosure will be described. As illustrated in FIGS. 7 and 8, a printer 100 according to the second embodiment is obtained by partially modifying the configuration of the printer 1 according to the first embodiment. In a configuration of the printer 100, components denoted by the same reference numerals as those of the printer 1 in FIGS. 7 and 8 are the same as those of the printer 1. The printer 100 includes a sub-tank 103, an ink jet head 104, and a cartridge holder 113.

The sub-tank 103 is mounted on the carriage 2. Two ink cartridges 114 ("liquid storage portion" of the present disclosure) arranged in the scanning direction are detachably mounted in the cartridge holder 113. Ink of the same color (for example, black ink) is stored in the two ink cartridges 114. The sub-tank 103 is connected to the two ink cartridges 114 via two tubes 115, and the ink is supplied from the two ink cartridges 114.

The ink jet head 104 has two nozzle rows 109, arranged in the scanning direction, formed by arranging the plurality of nozzles 10 at an interval Lb ("predetermined interval" of the present disclosure) in the conveying direction. In addition, positions, in the conveying direction of the nozzle row 109, of the nozzles 10 of the right side and the nozzle row 109 on the left side are shifted from each other by a length (Lb/2) that is half the interval Lb of the nozzles 10 in each nozzle row 109.

In the second embodiment, ink supplied from the ink cartridge 114 on the right side to the sub-tank 103 is supplied from the sub-tank 103 to the plurality of nozzles 10 forming the nozzle row 109 on the right side. In addition, in the second embodiment, ink supplied from the ink cartridge 114 on the left side to the sub-tank 103 is supplied from the sub-tank 103 to the plurality of nozzles 10 forming the nozzle row 109 on the left side.

In the second embodiment, of the two ink cartridges 114, one ink cartridge 114 corresponds to a "first liquid storage portion" of the present disclosure, and the other ink cartridge 114 corresponds to a "second liquid storage portion" of the present disclosure. In addition, the plurality of nozzles 10 that form one of the two nozzle rows 109 and are supplied with ink from the ink cartridge 114 serving as the first liquid storage portion correspond to "first nozzles" of the present disclosure. Further, the plurality of nozzles 10 that form the other of the two nozzle rows 109 and are supplied with ink from the ink cartridge 114 serving as the second liquid storage portion correspond to "second nozzles" of the present disclosure.

In the second embodiment, flow paths and the tubes 115 in the ink jet head 104 and the sub-tank 103, which connect the first nozzles and the ink cartridge 114 serving as the first liquid storage portion, correspond to "first flow paths" of the present disclosure. In addition, flow paths and the tubes 115 in the ink jet head 104 and the sub-tank 103, which connect the second nozzles and the ink cartridge 114 serving as the second liquid storage portion, correspond to "second flow paths" of the present disclosure.

As illustrated in FIG. 8, the ink jet head 104 includes a plurality of first driving elements 120a ("first elements" of the present disclosure) and a plurality of second driving elements 120b ("second elements" of the present disclosure). The plurality of first driving elements 120a are individually provided in the above-mentioned plurality of first nozzles. The plurality of second driving elements 120b are individually provided in the above-mentioned plurality of second nozzles. The respective driving elements 120a and 120b are similar to the driving elements 20 according to the first embodiment. As described above, the ink jet head 104 includes the plurality of first driving elements 120a and the plurality of second driving elements 120b, but in FIG. 8, only one first driving element 120a and only one second driving element 120b are illustrated for convenience.

The printer 100 includes a first driver IC 130a ("first driving signal output unit" of the present disclosure) and a second driver IC 130b ("second driving signal output unit" of the present disclosure). The first driver IC 130a is connected to the plurality of first driving elements 120a, and is configured to output driving signals to the plurality of first driving elements 120a to drive the plurality of first driving elements 120a individually. The second driver IC 130b is connected to the plurality of second driving elements 120b, and is configured to output driving signals to the plurality of second driving elements 120b to drive the plurality of second driving elements 120b individually.

<Processing During Recording>

Next, processing performed by the controller 80 in a case where the recording on the recording sheet P is performed in the printer 100 according to the second embodiment will be described.

Figure 9:
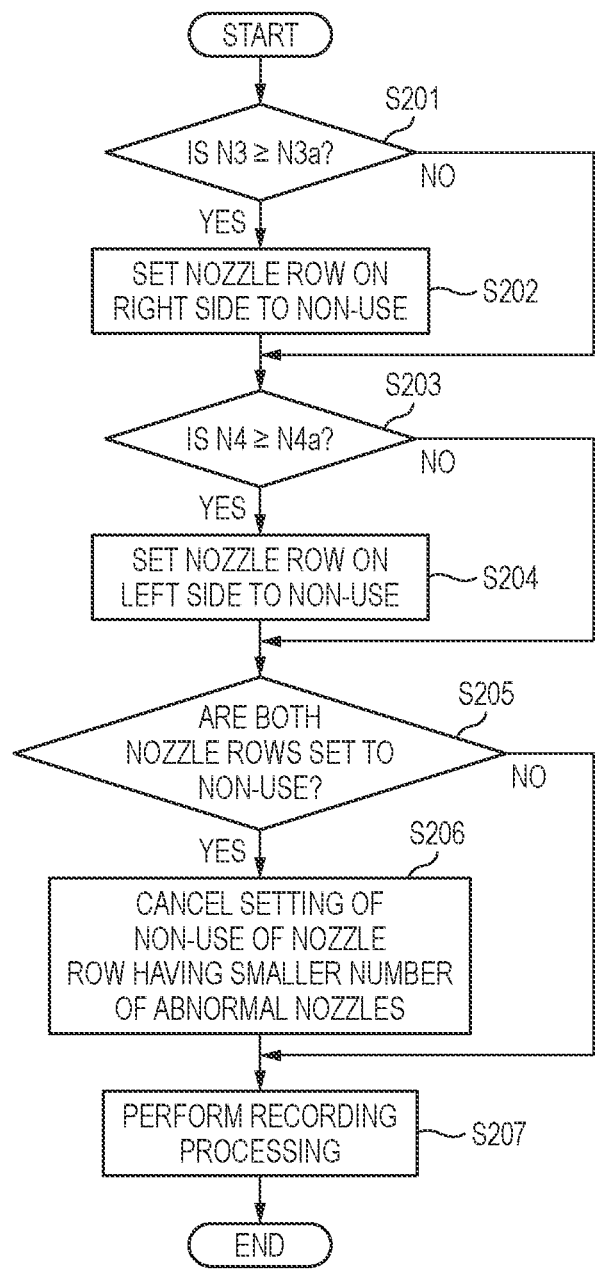
FIG. 9 is a flowchart illustrating a flow of processing in a case where recording is performed in the printer according to the second embodiment.

In the printer 100, in a case where the controller 80 receives a recording instruction signal, the processing is performed with reference to a flow shown in FIG. 9. The flow shown in FIG. 9 will be described in more detail. First, the controller 80 determines whether the number N3 of abnormal nozzles in the nozzle row 109 on the right side is equal to or greater than a predetermined number N3a, based on the abnormal nozzle information stored in the flash memory 84 (step S201). Here, the predetermined number N3a may be one or two or more. In a case where the predetermined number N3a is one, in step S201, it is determined whether there is an abnormal nozzle among the plurality of nozzles 10 forming the nozzle row 109 on the right side.

In a case where the number N3 of abnormal nozzles is less than the predetermined number N3a (NO in step S201), the processing directly proceeds to step S203. In a case where the number N3 of abnormal nozzles is equal to or greater than the predetermined number N3a (YES in step S201), the controller 80 sets the nozzle row 109 on the right side to non-use (step S202), and the processing proceeds to step S203.

In step S203, the controller 80 determines whether the number N4 of abnormal nozzles in the nozzle row 109 on the left side is equal to or greater than a predetermined number N4a, based on the abnormal nozzle information stored in the flash memory 84. Here, the predetermined number N4a may be one or two or more. In a case where the predetermined number N4a is one, in step S203, it is determined whether there is an abnormal nozzle among the plurality of nozzles 10 forming the nozzle row 109 on the left side. In addition, the predetermined number N4a may be the same as the predetermined number N3a, or may be different from the predetermined number N3a.

In a case where the number N4 of abnormal nozzles is less than the predetermined number N4a (NO in step S203), the processing directly proceeds to step S205. In a case where the number N4 of abnormal nozzles is equal to or greater than the predetermined number N4a (YES in step S203), the controller 80 sets the nozzle row 109 on the left side to non-use (step S204), and the processing proceeds to step S205.

In a case where it is assumed that the nozzles 10 forming the nozzle row 109 on the right side are the first nozzles and the nozzles 10 forming the nozzle row 109 on the left side are the second nozzles, the predetermined number N3a corresponds to a "first predetermined number" of the present disclosure, and the predetermined number N4a corresponds to a "second predetermined number" of the present disclosure. In a case where it is assumed that the nozzles 10 forming the nozzle row 109 on the left side are the first nozzles and the nozzles 10 forming the nozzle row 109 on the right side are the second nozzles, the predetermined number N4a corresponds to the "first predetermined number" of the present disclosure, and the predetermined number N3a corresponds to the "second predetermined number" of the present disclosure.

In step S205, the controller 80 determines whether both of the nozzle rows 109 are set to non-use. In a case where none of the nozzle rows 109 is set to non-use or only one of the nozzle rows 109 is set to non-use (NO in step S205), the processing directly proceeds to step S207. In a case where both of the nozzle rows 109 are set to non-use (YES in step S205), the controller 80 cancels a setting of non-use of a nozzle row 109 having a smaller number of abnormal nozzles among the two nozzle rows 109 (step S206), and the processing proceeds to step S207.

In step S207, the controller 80 performs a recording processing. In the recording processing, the controller 80 is configured to repeatedly perform the recording pass and the conveying operation as described above to perform the recording on the recording sheet P. However, in the second embodiment, in the conveying operation, the recording sheet P is conveyed, in the conveying direction, by the same length as the interval, in the conveying direction, between the most upstream nozzle 10 of the nozzle row 109 on the right side and the most downstream nozzle 10 of the nozzle row 109 on the left side. In addition, in a case where the recording pass is performed in the recording processing, the controller 80 is configured to drive the ink jet head 4 to eject ink only from the nozzles 10 forming the nozzle row 109 that is not set to non-use. In this case, the ink is ejected from the nozzles 10 such that landing positions, in the scanning direction, of the ink ejected from the nozzles 10 on the recording sheet P are the same in the nozzle row 109 on the left side and the nozzle row 109 on the right side.

Figure 10A:
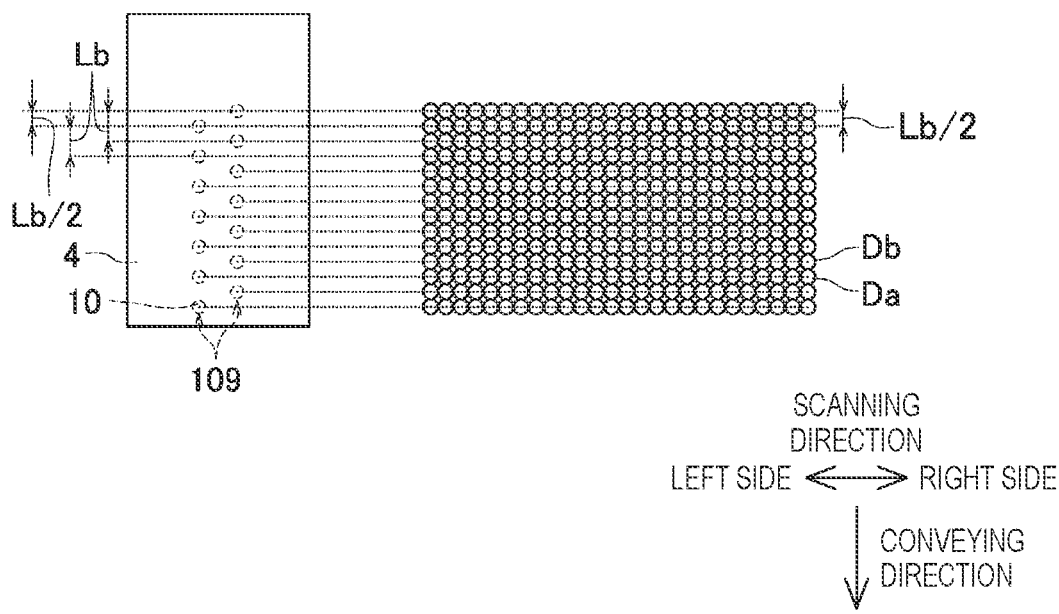
FIG. 10A is a diagram illustrating a case where recording is performed by ejecting ink from nozzles forming two nozzle rows in the second embodiment.

As a result, in a case where the number N3 of abnormal nozzles is less than the predetermined number N3a and the number N4 of abnormal nozzles is less than the predetermined number N4a, none of the nozzle rows 109 is set to non-use, and as illustrated in FIG. 10A, in the recorded image, dots Da formed by the ink ejected from the nozzles 10 forming the nozzle row 109 on the left side and dots db formed by the ink ejected from the nozzles 10 forming the nozzle row 109 on the right side are alternately arranged in the conveying direction. In this case, in each recording pass, the image is recorded, on the recording sheet P, with the resolution, in the conveying direction, in which an interval between the dots Da and the dots db adjacent in the conveying direction is (Lb/2). In addition, since the recording sheet P is conveyed, in the conveying direction, by the same length as the interval, in the conveying direction, between the most upstream nozzle 10 of the nozzle row 109 on the right side and the most downstream nozzle 10 of the nozzle row 109 on the left side by the conveying operation, the resolution, in the conveying direction, of the recorded image is also the resolution in which the interval between the adjacent dots Da and dots db is (Lb/2). The recording processing performed in this case corresponds to the "first recording processing" of the present disclosure.

Figure 10B:
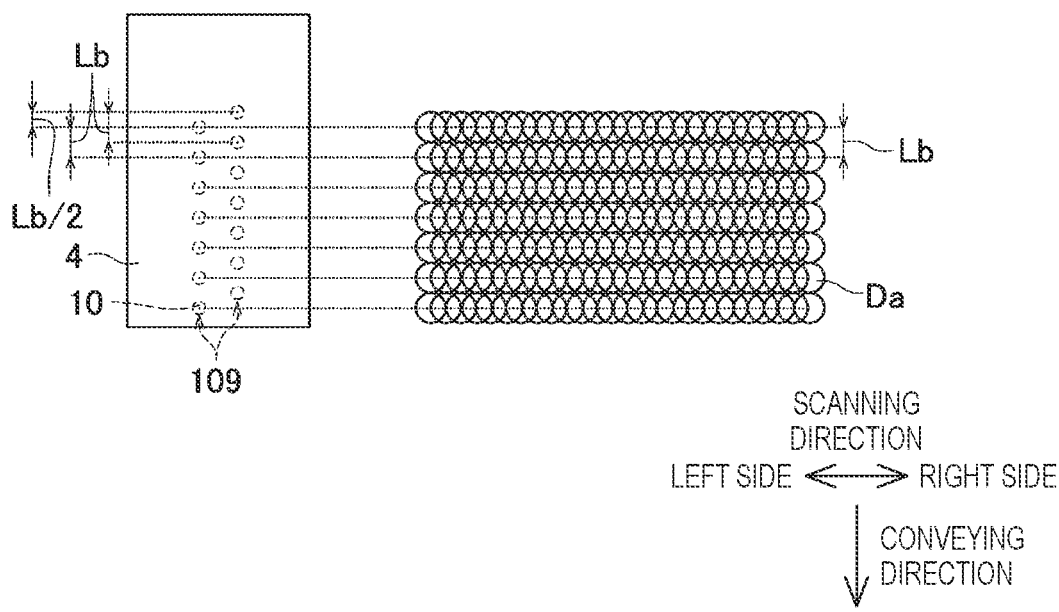
FIG. 10B is a diagram illustrating a case where the recording is performed by ejecting ink only from nozzles forming a nozzle row on a left side in the second embodiment.

In a case where the number N3 of abnormal nozzles is equal to or greater than the predetermined number N3a and the number N4 of abnormal nozzles is less than the predetermined number N4a, only the nozzle row 109 on the right side is set to non-use, and as illustrated in FIG. 10B, the recorded image is formed by the dots Da obtained by thinning out the dots db from the image illustrated in FIG. 10A. In this case, in each recording pass, the image is recorded, on the recording sheet P, with a resolution in the conveying direction (resolution that is half the resolution in the case of FIG. 10A) in which the interval between the dots Da adjacent to each other in the conveying direction is Lb. In addition, since the recording sheet P is conveyed, in the conveying direction, by the same length as the interval in the conveying direction between the most upstream nozzle 10 of the nozzle row 109 on the right side and the most downstream nozzle 10 of the nozzle row 109 on the left side by the conveying operation, the resolution in the conveying direction of the recorded image in this case is also the resolution in the conveying direction in which the interval between the dots Da in the conveying direction is Lb (resolution that is half the resolution in the case of FIG. 10A).

Figure 10C:
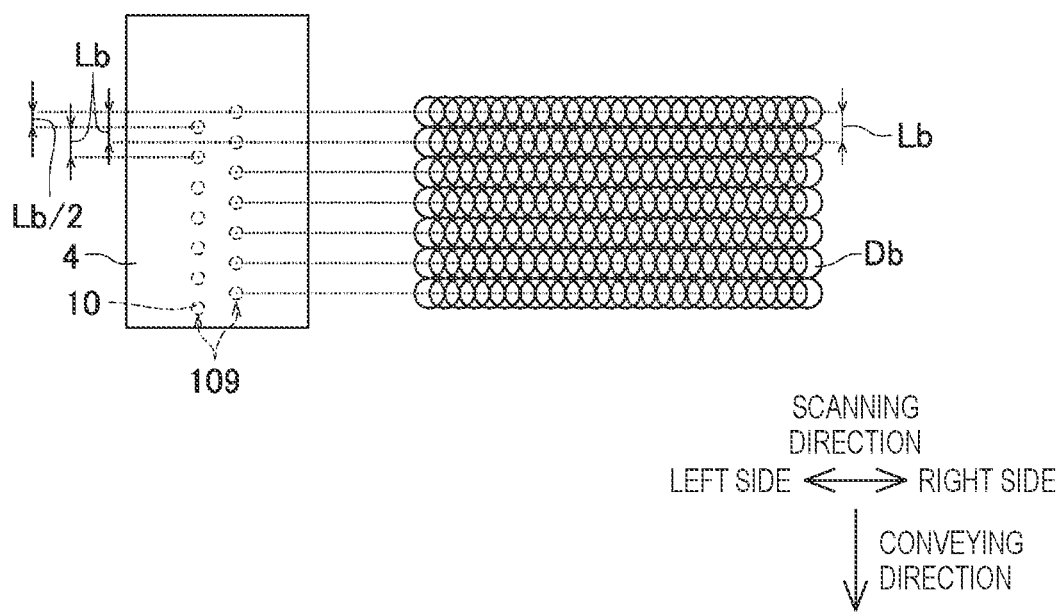
FIG. 10C is a diagram illustrating a case where the recording is performed by ejecting ink only from nozzles forming a nozzle row on a right side in the second embodiment.

In a case where the number N3 of abnormal nozzles is less than the predetermined number N3a and the number N4 of abnormal nozzles is equal to or greater than the predetermined number N4a, only the nozzle row 109 on the left side is set to non-use, and as illustrated in FIG. 10C, the image recorded is formed by the dots db obtained by thinning out the dots Da from the image illustrated in FIG. 10A. In this case, in each recording pass, the image is recorded, on the recording sheet P, with a resolution in the conveying direction (resolution that is half the resolution in the case of FIG. 10A) in which the interval between the dots db adjacent to each other in the conveying direction is Lb. In addition, since the recording sheet P is conveyed, in the conveying direction, by the same length as the interval in the conveying direction between the most upstream nozzle 10 of the nozzle row 109 on the right side and the most downstream nozzle 10 of the nozzle row 109 on the left side by the conveying operation, the resolution, in the conveying direction, of the recorded image in this case is also the resolution in the conveying direction in which the interval between the dots db in the conveying direction is Lb (resolution that is half the resolution in the case of FIG. 10A).

In a case where it is assumed that the nozzles 10 forming the nozzle row 109 on the right side are the first nozzles of the present disclosure and the nozzles 10 forming the nozzle row 109 on the left side are the second nozzles of the present disclosure, the recording processing of step S207 when the recording is performed as illustrated in FIG. 10B corresponds to the "second recording processing" of the present disclosure. On the other hand, in a case where it is assumed that the nozzles 10 forming the nozzle row 109 on the left side are the first nozzles of the present disclosure and the nozzles 10 forming the nozzle row 109 on the right side are the second nozzles of the present disclosure, the recording processing of step S207 when the recording is performed as illustrated in FIG. 10C corresponds to the "second recording processing" of the present disclosure.

In a case where the number N3 of abnormal nozzles is equal to or greater than the predetermined number N3a, the number N4 of abnormal nozzles is equal to or greater than the predetermined number N4a, and the number N4 of abnormal nozzles is smaller than the number N3 of abnormal nozzles, as illustrated in FIG. 10B, the recording is performed by ejecting the ink from the plurality of nozzles 10 forming the nozzle row 109 on the left side. On the other hand, in a case where the number N3 of abnormal nozzles is equal to or greater than the predetermined number N3a, the number N4 of abnormal nozzles is equal to or greater than the predetermined number N4a, and the number N3 of abnormal nozzles is smaller than the number N4 of abnormal nozzles, as illustrated in FIG. 10C, the recording is performed by ejecting the ink from the plurality of nozzles 10 forming the nozzle row 109 on the right side. That is, the recording is performed by ejecting the ink from the plurality of nozzles 10 forming the nozzle row 109 having a smaller number of abnormal nozzles among the two nozzle rows 109. In the second embodiment, the recording processing performed in this case corresponds to a "third recording processing" of the present disclosure.

As illustrated in FIGS. 10A to 10C, in a case where the recording is performed by ejecting the ink only from the nozzles 10 forming one of the two nozzle rows 109, sizes of the dots Da and db are increased by increasing the amount of ink ejected from the nozzles 10 as compared with a case where the recording is performed by ejecting the ink from the nozzles 10 forming both the nozzle rows 109.

In a case where the number N3 of abnormal nozzles is equal to or greater than the predetermined number N3a, the number N4 of abnormal nozzles is equal to or greater than the predetermined number N4a, and the number N3 of abnormal nozzles is the same as the number N4 of abnormal nozzles, the recording may be performed by ejecting the ink only from the nozzles 10 forming the nozzle row 109 on the right side as illustrated in FIG. 10B, or the recording may be performed by ejecting the ink only from the nozzles 10 forming the nozzle row 109 on the left side as illustrated in FIG. 10C.

<Effects>

In the second embodiment, between the nozzle row 109 on the right side and the nozzle row 109 on the left side, the positions, in the conveying direction, of the nozzles 10 are shifted by the length (Lb/2) that is half the interval Lb between the nozzles 10 in each nozzle row 109. In a case where the number N3 of abnormal nozzles is less than the predetermined number N3a and the number N4 of abnormal nozzles is less than the predetermined number N4a, by performing the recording by driving the ink jet head 104 to eject the ink from the plurality of nozzles 10 forming both the nozzle rows 109, the resolution, in the conveying direction, of the recorded image can be increased.

In the second embodiment, in a case where the number N3 of abnormal nozzles is less than the predetermined number N3a and the number N4 of abnormal nozzles is equal to or greater than the predetermined number N4a, the recording is performed by driving the ink jet head 4 such that the ink is not ejected from the nozzles 10 forming the nozzle row 109 on the left side and the ink is ejected from the nozzles 10 forming the nozzle row 109 on the right side. In addition, in a case where the number N3 of abnormal nozzles in the nozzle row 109 on the right side is equal to or greater than the predetermined number N3a and the number N4 of abnormal nozzles in the nozzle row 109 on the left side is less than the predetermined number N4a, the recording is performed by driving the ink jet head 4 such that the ink is not ejected from the nozzles 10 forming the nozzle row 109 on the right side and the ink is ejected from the nozzles 10 forming the nozzle row 109 on the left side. As a result, in a case where the number of abnormal nozzles in any of the nozzle rows 109 is equal to or greater than a predetermined number, the recording can be performed with a lower resolution in the conveying direction with a simple processing. In this case, since the image quality of the recorded image is uniformly lowered as the resolution in the conveying direction is lowered, as compared with the case where the image quality of the recorded image is partially lowered by performing the recording without lowering the resolution in the conveying direction and not ejecting the ink from the abnormal nozzle, the degradation in image quality is less noticeable.

In the second embodiment, in a case where the number N3 of abnormal nozzles is equal to or greater than the predetermined number N3a and the number N4 of abnormal nozzles is equal to or greater than the predetermined number N4a, the recording is performed by driving an ink jet head 204 such that the ink is ejected only from the plurality of nozzles 10 forming the nozzle row 109 having a smaller number of abnormal nozzles among the two nozzle rows 109. As a result, the recording can be performed with a lower resolution in the conveying direction with a simple processing. In addition, in a case where the recording is performed with a lower resolution in the conveying direction, deterioration in image quality due to ink not being ejected from the abnormal nozzle can be avoided as much as possible.

In the second embodiment, the ink is supplied, from different ink cartridges 114, to the plurality of nozzles 10 forming the nozzle row 109 on the right side and the plurality of nozzles 10 forming the nozzle row 109 on the left side. In addition, in the second embodiment, the plurality of first driving elements 120a corresponding to the plurality of nozzles 10 forming one of the nozzle rows 109 are driven by the first driver IC 130a, and the plurality of second driving elements 120b corresponding to the plurality of nozzles 10 forming the other of the nozzle rows 109 are driven by the second driver IC 130b. In the second embodiment, in the printer 100 having such a configuration, as described above, the recording as described above can be performed according to the number of abnormal nozzles 10 in each nozzle row 109.

Also, in the second embodiment, in a case where the recording is performed with a lower resolution in the conveying direction, by increasing the amount of ink ejected from the nozzles 10 to increase the size of the dots, an area of a region where the dots are not formed in the recorded image is reduced.

Third Embodiment

Figure 11:
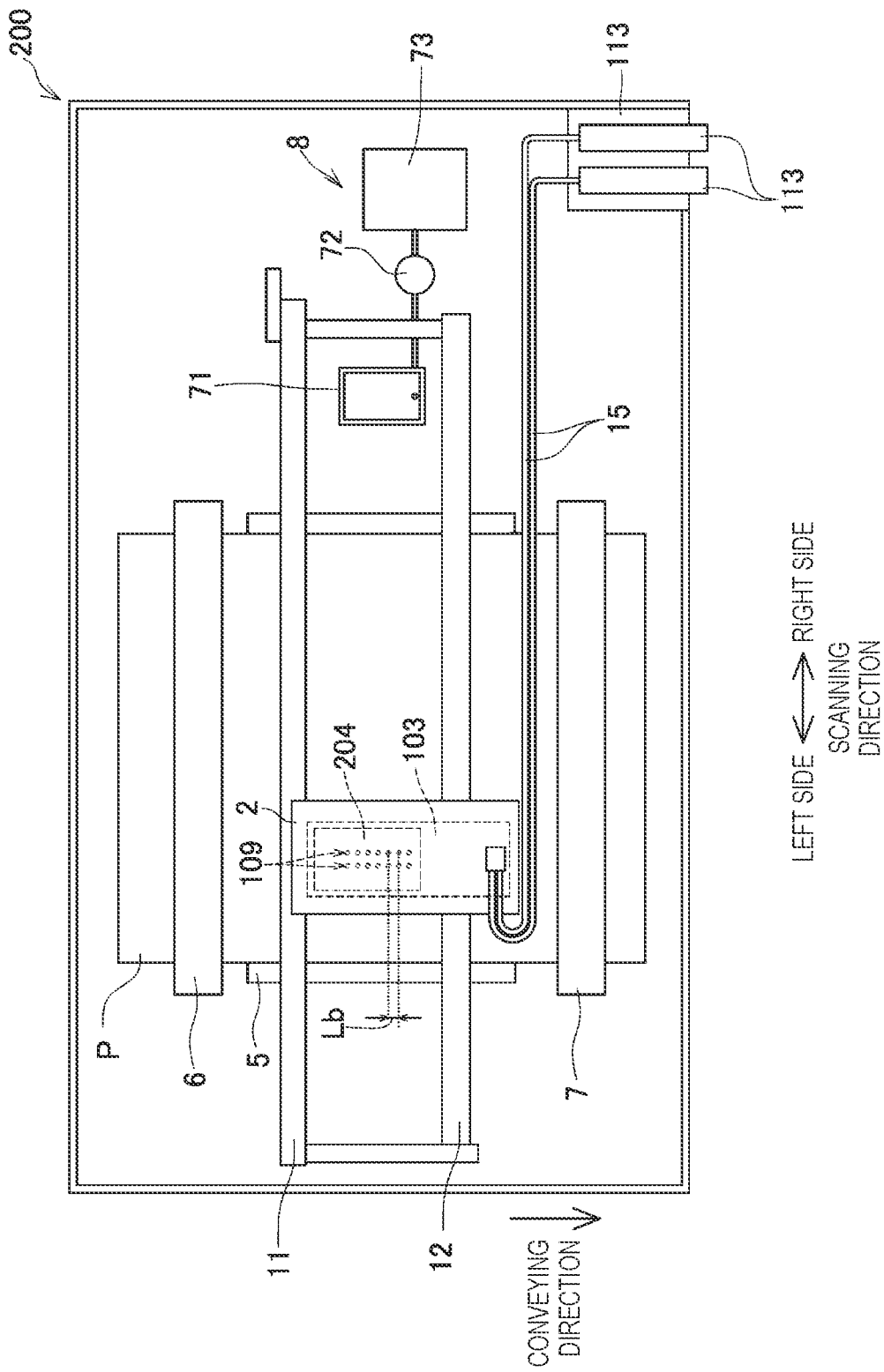
FIG. 11 is a schematic configuration diagram of a printer according to a third embodiment.

Next, a preferred third embodiment of the present disclosure will be described. As illustrated in FIG. 11, a printer 200 according to the third embodiment is obtained by replacing the ink jet head 104 in the printer 100 according to the second embodiment with the ink jet head 204. Similar to the ink jet head 104, the ink jet head 204 includes a plurality of nozzles 10 forming two nozzle rows 109, but unlike the ink jet head 104, positions, in the conveying direction, of the nozzles 10 of the two nozzle rows 109 are the same.

In a case where recording is performed in the printer 200 according to the third embodiment, the controller 80 is configured to perform processing with reference to the flow shown in FIG. 9, as described in the second embodiment. However, in the third embodiment, for example, in the recording processing of step S207, by setting ejection timings of the ink from the nozzles 10 in the two nozzle rows 109 in the recording pass to be the same, a landing position of ink ejected from the nozzles 10 forming the nozzle row 109 on the left side on the recording sheet P and a landing position of ink ejected from the nozzles 10 forming the nozzle row 109 on the right side on the recording sheet P are adjacent to each other in the scanning direction. In the printer 200 according to the third embodiment, a recording result of the recording processing is different from that in the second embodiment.

Figure 12A:
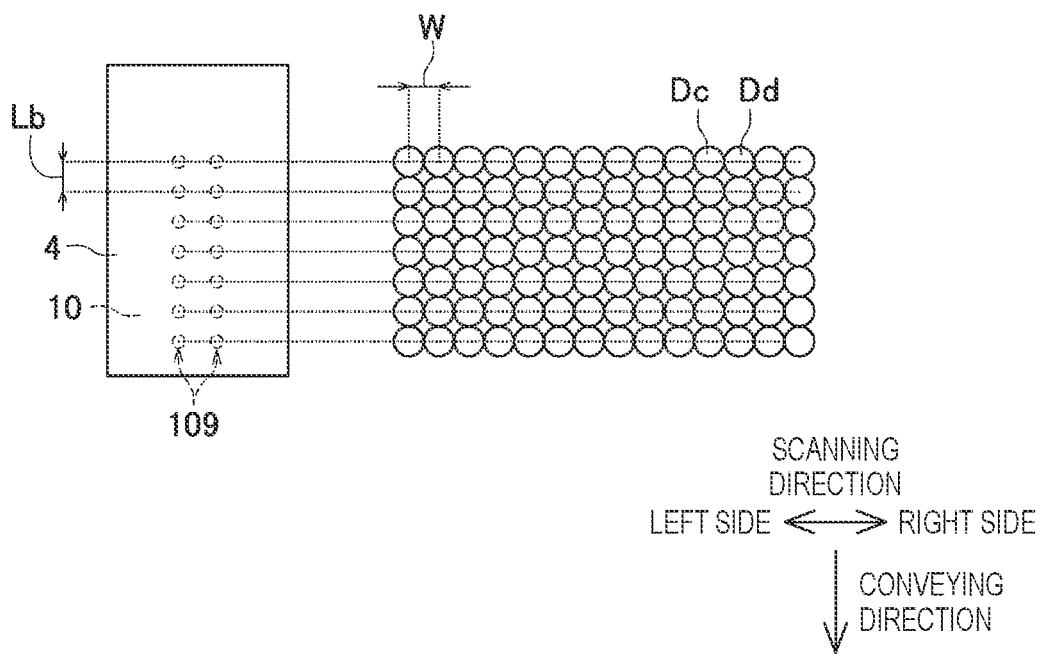
FIG. 12A is a diagram illustrating a case where recording is performed by ejecting ink from nozzles forming two nozzle rows in the third embodiment.

More specifically, in a case where the number N3 of abnormal nozzles is less than the predetermined number N3a and the number N4 of abnormal nozzles is less than the predetermined number N4a, none of the nozzle rows 9 is set to non-use, and as illustrated in FIG. 12A, dots Dc formed by the ink ejected from the nozzles 10 forming the nozzle row 109 on the left side and dots Dd formed by the ink ejected from the nozzles 10 forming the nozzle row 109 on the right side are alternately arranged in the scanning direction. The resolution, in the scanning direction, of the recorded image in this case is a resolution in which an interval, between adjacent dots Dc and Dd, in the scanning direction is W. The recording processing performed in this case corresponds to the "first recording processing" of the present disclosure.

Figure 12B:
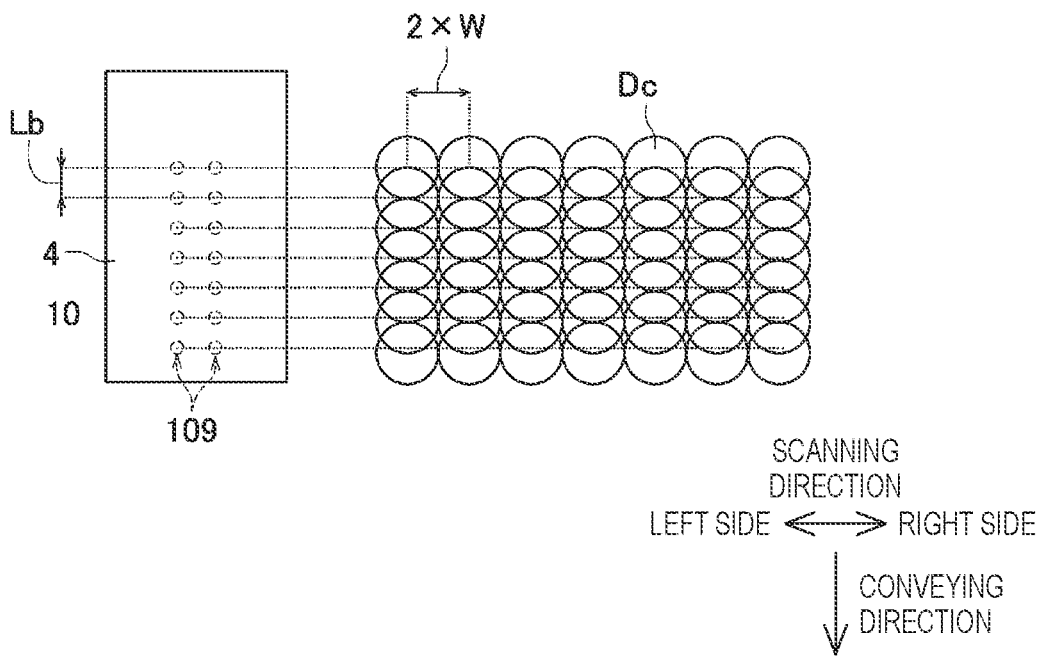
FIG. 12B is a diagram illustrating a case where the recording is performed by ejecting ink only from nozzles forming a nozzle row on a left side in the third embodiment.

In a case where the number N3 of abnormal nozzles is equal to or greater than the predetermined number N3a and the number N4 of abnormal nozzles is less than the predetermined number N4a, only the nozzle row 9 on the right side is set to non-use, and as illustrated in FIG. 12B, the recorded image is formed by the dots Dc obtained by thinning out the dots Dd from the image shown in FIG. 12A. The resolution, in the scanning direction, of the recorded image in this case is a resolution in which the interval between the dots Dc adjacent to each other in the scanning direction is (2×W) (half the resolution in the case of FIG. 10A).

Figure 12C:
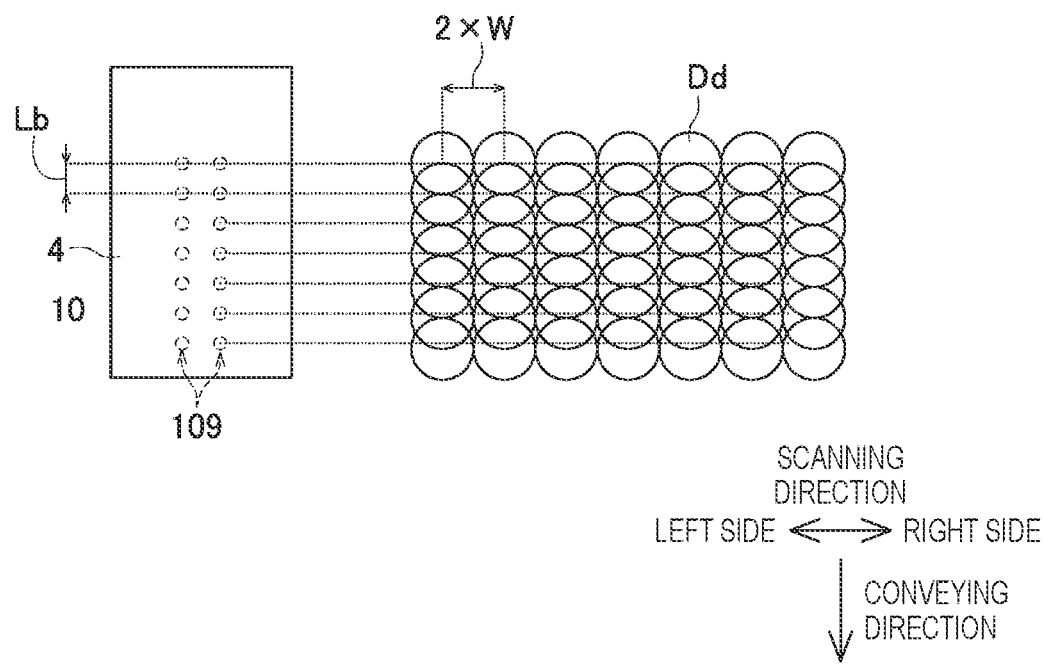
FIG. 12C is a diagram illustrating a case where the recording is performed by ejecting ink only from nozzles forming a nozzle row on a right side in the third embodiment.

In a case where the number N3 of abnormal nozzles is less than the predetermined number N3a and the number N4 of abnormal nozzles is equal to or greater than the predetermined number N4a, only the nozzle row 9 on the left side is set to non-use, and as illustrated in FIG. 12C, the recorded image is formed by the dots Dd obtained by thinning out the dots Dc from the image illustrated in FIG. 12A. The resolution, in the scanning direction, of the recorded image in this case is a resolution in which the interval between the dots Dd adjacent to each other in the scanning direction is (2×W) (half the resolution in the case of FIG. 10A).

In a case where it is assumed that the nozzles 10 forming the nozzle row 109 on the right side are the first nozzles of the present disclosure and the nozzles 10 forming the nozzle row 109 on the left side are the second nozzles of the present disclosure, the recording processing of step S207 when the recording is performed as illustrated in FIG. 12B corresponds to the "second recording processing" of the present disclosure. On the other hand, in a case where it is assumed that the nozzles 10 forming the nozzle row 109 on the left side are the first nozzles of the present disclosure and the nozzles 10 forming the nozzle row 109 on the right side are the second nozzles of the present disclosure, the recording processing of step S207 when the recording is performed as illustrated in FIG. 12C corresponds to the "second recording processing" of the present disclosure.

In a case where the number N3 of abnormal nozzles is equal to or greater than the predetermined number N3$a$, the number N4 of abnormal nozzles is equal to or greater than the predetermined number N4$a$, and the number N4 of abnormal nozzles is smaller than the number N3 of abnormal nozzles, as illustrated in FIG. 12B, the recording is performed by ejecting the ink from the plurality of nozzles 10 forming the nozzle row 109 on the left side. On the other hand, in a case where the number N3 of abnormal nozzles is equal to or greater than the predetermined number N3$a$, the number N4 of abnormal nozzles is equal to or greater than the predetermined number N4$a$, and the number N3 of abnormal nozzles is smaller than the number N4 of abnormal nozzles, as illustrated in FIG. 12C, the recording is performed by ejecting the ink from the plurality of nozzles 10 forming the nozzle row 109 on the right side. That is, the recording is performed by ejecting the ink from the plurality of nozzles 10 forming the nozzle row 109 having a smaller number of abnormal nozzles among the two nozzle rows 109. In the third embodiment, the recording processing performed in this case corresponds to the "third recording processing" of the present disclosure.

As illustrated in FIGS. 12A to 12C, in a case where the recording is performed by ejecting the ink only from the nozzles 10 forming one of the two nozzle rows 109, sizes of the dots Dc and Dd are increased by increasing the amount of ink ejected from the nozzles 10, as compared with a case where the recording is performed by ejecting the ink from the nozzles 10 forming both the nozzle rows 109.

In a case where the number N3 of abnormal nozzles is equal to or greater than the predetermined number N3$a$, the number N4 of abnormal nozzles is equal to or greater than the predetermined number N4$a$, and the number N3 of abnormal nozzles is the same as the number N4 of abnormal nozzles, the recording may be performed by ejecting the ink only from the nozzles 10 forming the nozzle row 109 on the right side as illustrated in FIG. 12B, or the recording may be performed by ejecting the ink only from the nozzles 10 forming the nozzle row 109 on the left side as illustrated in FIG. 12C.

<Effects>

In the third embodiment, the positions, in the conveying direction, of the nozzles 10 are the same in the nozzle row 109 on the right side and the nozzle row 109 on the left side. In a case where the number N3 of abnormal nozzles is less than the predetermined number N3$a$ and the number N4 of abnormal nozzles is less than the predetermined number N4$a$, by performing the recording by driving the ink jet head 204 to eject the ink from the plurality of nozzles 10 forming both the nozzle rows 109, the resolution, in the scanning direction, of the recorded image can be increased.

In the second embodiment, in a case where the number N3 of abnormal nozzles is less than the predetermined number N3$a$ and the number N4 of abnormal nozzles is equal to or greater than the predetermined number N4$a$, the recording is performed by driving the ink jet head 204 such that the ink is not ejected from the nozzles 10 forming the nozzle row 109 on the left side and the ink is ejected from the nozzles 10 forming the nozzle row 109 on the right side. In addition, in a case where the number N3 of abnormal nozzles is equal to or greater than the predetermined number N3$a$ and the number N4 of abnormal nozzles is less than the predetermined number N4$a$, the recording is performed by driving the ink jet head 204 such that the ink is not ejected from the nozzles 10 forming the nozzle row 109 on the right side and the ink is ejected from the nozzles 10 forming the nozzle row 109 on the left side. As a result, in a case where the number of abnormal nozzles in any of the nozzle rows 109 is equal to or greater than a predetermined number, the recording can be performed with a lower resolution in the scanning direction with a simple processing. In this case, since the image quality of the recorded image is uniformly lowered as the resolution in the scanning direction is lowered, as compared with the case where the image quality of the recorded image is partially lowered by performing the recording without lowering the resolution in the scanning direction and not ejecting the ink from the abnormal nozzle, the degradation in image quality is less noticeable.

In the third embodiment, in a case where the number N3 of abnormal nozzles is equal to or greater than the predetermined number N3$a$ and the number N4 of abnormal nozzles is equal to or greater than the predetermined number N4$a$, the recording is performed by driving the ink jet head 204 such that the ink is ejected only from the plurality of nozzles 10 forming the nozzle row 109 having a smaller number of abnormal nozzles among the two nozzle rows 109. As a result, the recording can be performed with a lower resolution in the scanning direction with simple processing. In addition, in a case where the recording is performed with a lower resolution in the scanning direction, deterioration in image quality due to ink not being ejected from the abnormal nozzle can be avoided as much as possible.

Fourth Embodiment

Figure 13:
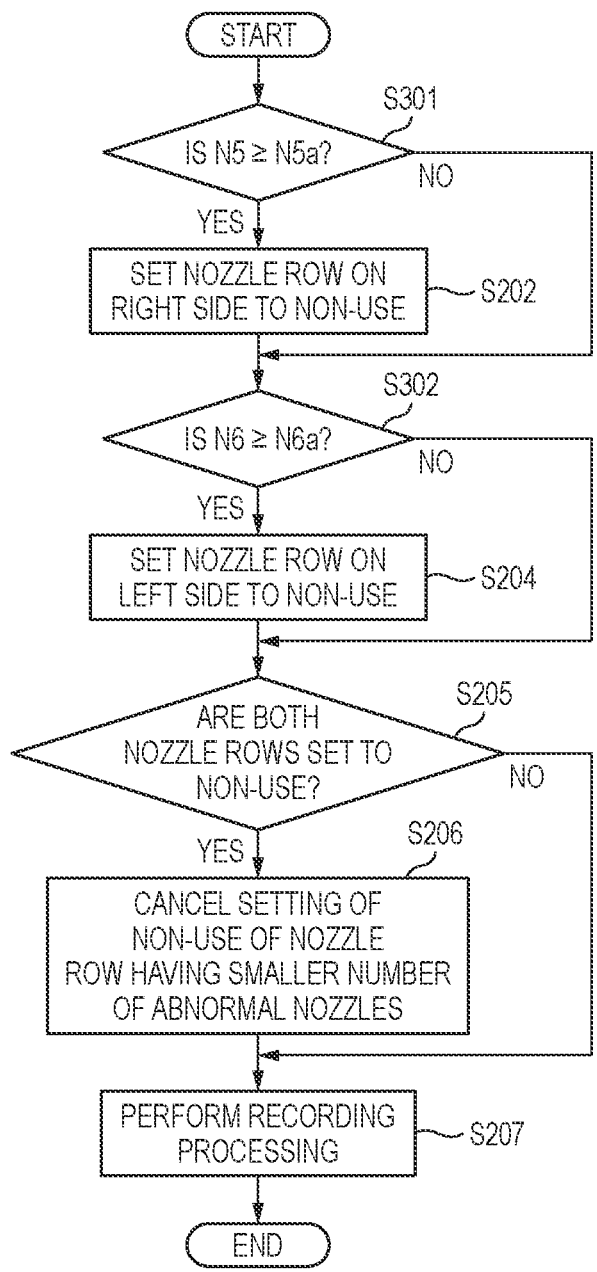
FIG. 13 is a flowchart illustrating a flow of processing in a case where recording is performed in a printer according to a fourth embodiment.

Next, a preferred fourth embodiment of the present disclosure will be described. The fourth embodiment relates to the printer 100 similar to that of the second embodiment or the printer 200 similar to that of the third embodiment. In the fourth embodiment, in a case where recording is performed in the printer, the controller 80 is configured to perform processing with reference to a flow shown in FIG. 13. In the flow shown in FIG. 13, step S201 of the flow in FIG. 9 is replaced with step S301, and step S203 of the flow shown in FIG. 9 is replaced with step S302.

In step S301, based on the abnormal nozzle information stored in the flash memory 84 and the recording data, the controller 80 determines whether the number N5 of abnormal nozzles, among the nozzles 10 used in the case where the recording is performed by ejecting the ink based on the recording data among the plurality of nozzles 10 forming the nozzle row 109 on the right side, is equal to or greater than a predetermined number N5$a$. Here, the predetermined number N5$a$ may be one or two or more. Then, in a case where the number N5 of abnormal nozzles is less than the predetermined number N5$a$ (NO in step S301), the processing proceeds to step S203. In a case where the number N5 of abnormal nozzles is equal to or greater than the predetermined number N5$a$ (YES in step S301), the processing proceeds to step S203.

In step S302, based on the abnormal nozzle information stored in the flash memory 84 and the recording data, the controller 80 determines whether the number N6 of abnormal nozzles, among the nozzles 10 used in the case where the recording is performed by ejecting the ink based on the recording data in the nozzle row 109 on the left side, is equal to or greater than a predetermined number N6$a$. Here, the predetermined number N6a may be one or two or more. Then, in a case where the number N6 of abnormal nozzles is less than the predetermined number N6a (NO in step S302), the processing proceeds to step S205. In a case where the number N6 of abnormal nozzles is equal to or greater than the predetermined number N6a (YES in step S302), the processing proceeds to step S204.

In the fourth embodiment, in a case where it is assumed that the nozzles 10 forming the nozzle row 109 on the right side are the first nozzles and the nozzles 10 forming the nozzle row 109 on the left side are the second nozzles, the predetermined number N5a corresponds to the "first predetermined number" of the present disclosure, and the predetermined number N6a corresponds to the "second predetermined number" of the present disclosure. In a case where it is assumed that the nozzles 10 forming the nozzle row 109 on the left side are the first nozzles and the nozzles 10 forming the nozzle row 109 on the right side are the second nozzles, the predetermined number N6a corresponds to the "first predetermined number" of the present disclosure, and the predetermined number N5a corresponds to the "second predetermined number" of the present disclosure.

<Effects>

In the fourth embodiment, in a case where the number N5 of abnormal nozzles is less than the predetermined number N5a and the number N6 of normal nozzles is less than the predetermined number N6a, the recording is performed by ejecting the ink from the nozzles 10 forming both of the nozzle rows 109. As a result, recording with a high resolution in the conveying direction or the scanning direction can be performed.

On the other hand, in a case where the number N5 of abnormal nozzles is equal to or greater than the predetermined number N5a and the number N6 of abnormal nozzles is less than the predetermined number N6a, the recording is performed by not ejecting the ink from the nozzles 10 forming the nozzle row 109 on the right side and ejecting the ink from the nozzles 10 forming the nozzle row 109 on the left side. In a case where the number N5 of abnormal nozzles is less than the predetermined number N5a and the number N6 of abnormal nozzles is equal to or greater than the predetermined number N6a, the recording is performed by not ejecting the ink from the nozzles 10 forming the nozzle row 109 on the left side and ejecting the ink from the nozzles 10 forming the nozzle row 109 on the right side. As a result, in a case where the number of abnormal nozzles, among the nozzles 10 used when the ink is ejected based on the recording data, is equal to or greater than a predetermined number in one of the nozzle rows 109 and less than a predetermined number in the other of the nozzle rows, the recording can be performed with a lower resolution, in the conveying direction or the scanning direction, with simple processing. In this case, since the image quality of the recorded image is uniformly lowered, as compared with the case where the image quality of the recorded image is partially lowered by performing the recording without lowering the resolution and not ejecting the ink from the abnormal nozzle, the degradation in image quality is less noticeable.

Fifth Embodiment

Next, a preferred fifth embodiment of the present disclosure will be described. The fifth embodiment relates to the printer 1 similar to that of the first embodiment. However, in the fifth embodiment, the recording can be selectively performed in either a monochrome mode or a color mode in the printer 1. The monochrome mode is a mode in which black ink is stored in all of the four ink cartridges 14 mounted in the cartridge holder 13, and the black ink is ejected from all of the plurality of nozzles 10 of the ink jet head 4 to perform monochrome recording. The color mode is a mode in which black ink, yellow ink, cyan ink, and magenta ink are stored in the four ink cartridges 14 mounted in the cartridge holder 13 as described in the first embodiment, and the four colors of ink are ejected from the plurality of nozzles 10 of the ink jet head 4 to perform color recording.

In the fifth embodiment, in order to switch from the color mode to the monochrome mode, for example, among the four ink cartridges 14 mounted in the cartridge holder 13, three ink cartridges 14 on the left side storing the color ink are removed, and ink cartridges 14 storing black ink are mounted instead. Then, suction purge is performed to replace, with black ink, the color ink in the ink jet head 4, the sub-tank 3, and the tube 15.

In addition, in order to switch from the monochrome mode to the color mode, for example, among the four ink cartridges 14 mounted in the cartridge holder 13, three ink cartridges 14 on the left side storing black ink are removed, and ink cartridges 14 storing color ink are mounted instead. Then, the suction purge is performed to replace, with color ink, the black ink in the ink jet head 4, the sub-tank 3, and the tube 15. However, since the black ink is darker than the color ink, color ink of appropriate colors may not be ejected from the nozzles 10 even in such a case. Therefore, the printer according to the fifth embodiment may be configured to be switched from the monochrome mode to the color mode and not configured to be switched from the color mode to the monochrome mode.

In the fifth embodiment, the plurality of nozzles 10 configuring any one of the four nozzle rows 9 correspond to the "first nozzles" of the present disclosure. In addition, the plurality of nozzles 10 configuring any one of three nozzle rows 9, excluding the nozzle row 9 configured by the above-mentioned first nozzles 10, correspond to the "second nozzles" of the present disclosure. Further, the plurality of nozzles 10 configuring one of two nozzle rows 9, excluding the nozzle row 9 configured by the above-mentioned first nozzles and the nozzle row 9 configured by the above-mentioned second nozzles, correspond to "third nozzles" of the present disclosure, and the plurality of nozzles 10 configuring the other of the two nozzle rows 9 correspond to "fourth nozzles" of the present disclosure.

In the fifth embodiment, the four ink cartridges 14 correspond to the "liquid storage portions" of the present disclosure. In addition, the ink cartridges 14 corresponding to the first to fourth nozzles correspond to the "first liquid storage portion", the "second liquid storage portion", a "third liquid storage portion", and a "fourth liquid storage portion" of the present disclosure, respectively.

Flow paths and the tubes 15 in the ink jet head 4 and the sub-tank 3, which connect the first nozzle and the ink cartridge 14 serving as the first liquid storage portion, correspond to the "first flow paths" of the present disclosure. Flow paths and the tubes 15 in the ink jet head 4 and the sub-tank 3, which connect the second nozzle and the ink cartridge 14 serving as the second liquid storage portion, correspond to the "second flow paths" of the present disclosure. Flow paths and the tubes 15 in the ink jet head 4 and the sub-tank 3, which connect the third nozzle and the ink cartridge 14 serving as the third liquid storage portion, correspond to the "third flow paths" of the present disclosure. Flow paths and the tubes 15 in the ink jet head 4 and the sub-tank 3, which connect the fourth nozzle and the ink cartridge 14 serving as the fourth liquid storage portion, correspond to the "fourth flow paths" of the present disclosure.

Figure 14A:
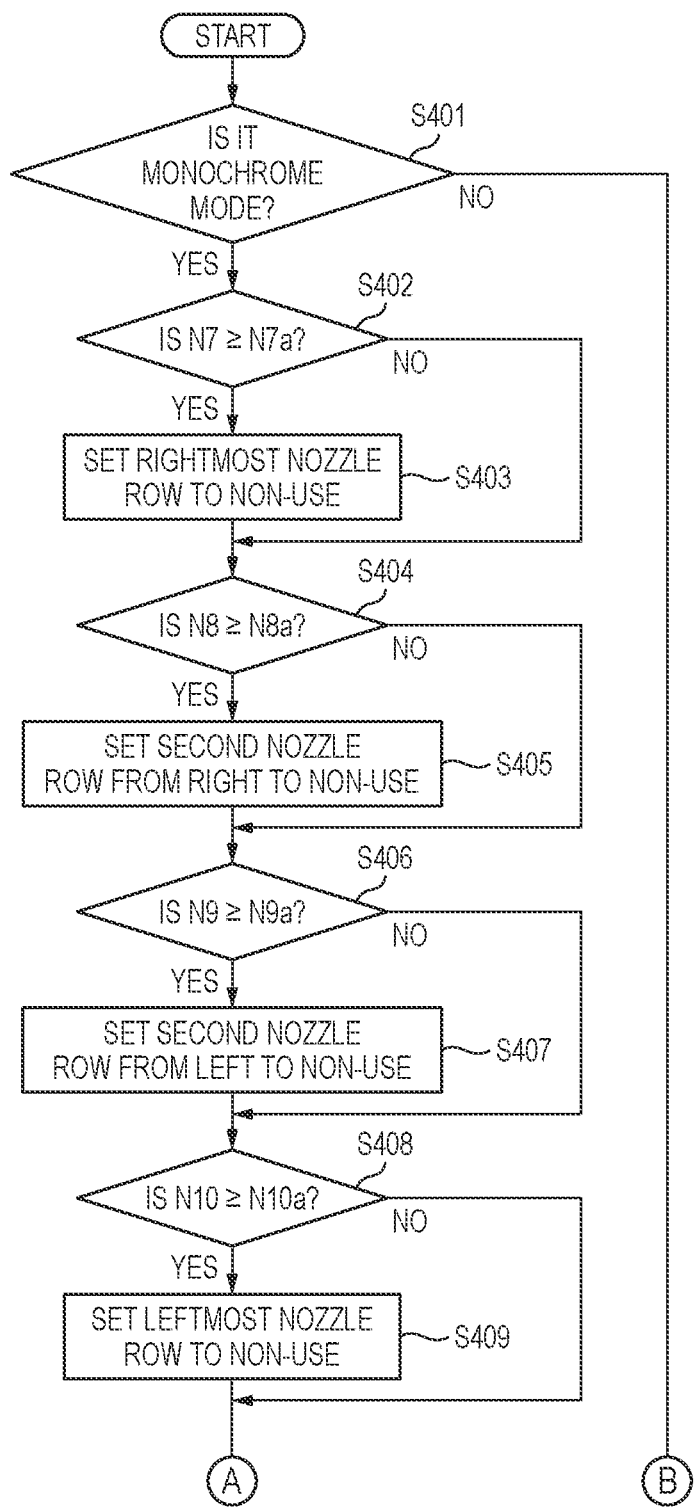
FIG. 14A is a flowchart illustrating a flow of processing in a case where recording is performed in a printer according to a fifth embodiment.
Figure 14B:
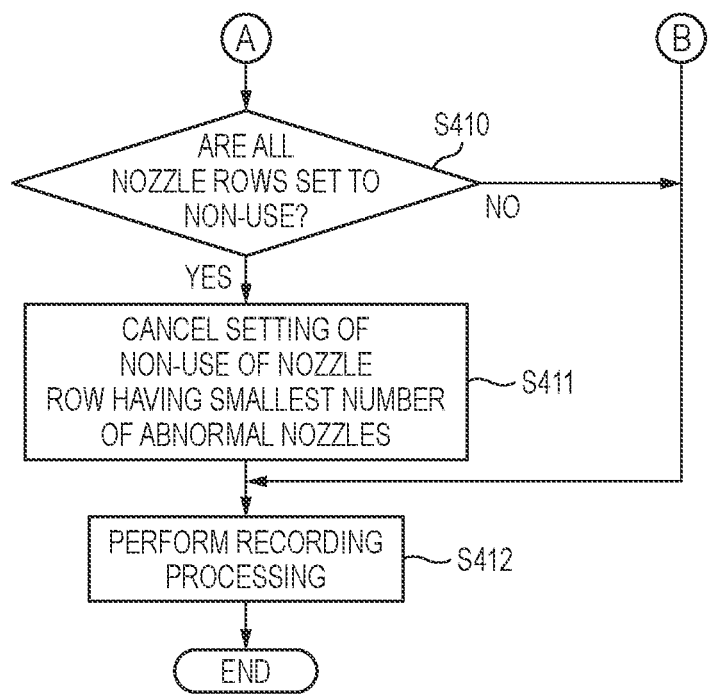
FIG. 14B is the flowchart illustrating the flow of processing in a case where recording is performed in a printer according to a fifth embodiment.

In the fifth embodiment, in a case where the recording on the recording sheet P is performed in the printer 1, the controller 80 performs processing with reference to a flow shown in FIGS. 14A and 14B. The flow shown in FIGS. 14A and 14B will be described in more detail. First, the controller 80 is configured to determine whether the mode is the monochrome mode (step S401). In the fifth embodiment, for example, information indicating whether the mode is the monochrome mode or the color mode is stored in the flash memory 84 in advance, based on an operation of the operation unit 68 by the user. Then, in step S401, the controller 80 determines whether the mode is the monochrome mode, based on the above-mentioned information stored in the flash memory 84. Alternatively, for example, the ink cartridge 14 may include an IC chip in which color information of the stored ink is stored, and the cartridge holder 13 may include a reading unit configured to read information from the IC chip. Then, in step S401, the controller 80 may determine whether the mode is the monochrome mode, based on the color information of the ink stored in each ink cartridge 14 read from the IC chip via the reading unit.

In a case where the mode is not the monochrome mode, that is, in a case where the mode is the color mode (NO in step S401), the processing proceeds to step S412. In a case where the mode is the monochrome mode (YES in step S401), the controller 80 determines whether the number N7 of abnormal nozzles in the rightmost nozzle row 9 is equal to or greater than a predetermined number N7a, based on the abnormal nozzle information stored in the flash memory 84 (step S402). Here, the predetermined number N7a may be one or two or more.

In a case where the number N7 of abnormal nozzles is less than the predetermined number N7a (NO in step S402), the processing directly proceeds to step S404. In a case where the number N7 of abnormal nozzles is equal to or greater than the predetermined number N7a (YES in step S402), the controller 80 sets the rightmost nozzle row 9 to non-use (step S403), and the processing proceeds to step S404.

In step S404, the controller 80 determines whether the number N8 of abnormal nozzles in a second nozzle row 9 from the right is equal to or greater than a predetermined number N8a, based on the abnormal nozzle information stored in the flash memory 84. Here, the predetermined number N8a may be one or two or more. In addition, the predetermined number N8a may be the same as the predetermined number N7a, or may be different from the predetermined number N7a.

In a case where the number N8 of abnormal nozzles is less than the predetermined number N8a (NO in step S404), the processing directly proceeds to step S406. In a case where the number N8 of abnormal nozzles is equal to or greater than the predetermined number N8a (YES in step S404), the controller 80 sets the second nozzle row 9 from the right to non-use (step S405), and the processing proceeds to step S406.

In step S406, the controller 80 determines whether the number N9 of abnormal nozzles in a second nozzle row 9 from the left is equal to or greater than a predetermined number N9a, based on the abnormal nozzle information stored in the flash memory 84. Here, the predetermined number N9a may be one or two or more. In addition, the predetermined number N9a may be equal to any one of the predetermined numbers N7a and N8a, or may be different from any one of the predetermined numbers N7a and N8a.

In a case where the number N9 of abnormal nozzles is less than the predetermined number N9a (NO in step S406), the processing directly proceeds to step S408. In a case where the number N9 of abnormal nozzles is equal to or greater than the predetermined number N9a (YES in step S406), the controller 80 sets the second nozzle row 9 from the left to non-use (step S407), and the processing proceeds to step S408.

In step S408, the controller 80 determines whether the number N10 of abnormal nozzles in the leftmost nozzle row 9 is equal to or greater than a predetermined number N10a, based on the abnormal nozzle information stored in the flash memory 84. Here, the predetermined number N10a may be one or two or more. In addition, the predetermined number N10a may be equal to any one of the predetermined numbers N7a, N8a, and N9a, or may be different from any one of the predetermined numbers N7a, N8a, and N9a.

In a case where the number N10 of abnormal nozzles is less than the predetermined number N10a (NO in step S408), the processing directly proceeds to step S410. In a case where the number N10 of abnormal nozzles is equal to or greater than the predetermined number N10a (YES in step S408), the controller 80 sets the leftmost nozzle row 9 to non-use (step S409), and the processing proceeds to step S410.

In the fifth embodiment, among the predetermined numbers N7a, N8a, N9a, and N10a, those corresponding to the first nozzle correspond to the "first predetermined number" of the present disclosure, and those corresponding to the second nozzle correspond to the "second predetermined number" of the present disclosure.

In step S410, the controller 80 determines whether all of the nozzle rows 9 are set to non-use. In a case where none of the nozzle rows 9 is set to non-use or only a part of the nozzle rows 9 are set to non-use (NO in step S410), the processing directly proceeds to step S412. In a case where all of the nozzle rows 9 are set to non-use (YES in S410), the controller 80 cancels a setting of non-use of a nozzle row 9 having the smallest number of abnormal nozzles among the four nozzle rows 9 (step S411), and the processing proceeds to step S412.

In step S412, the controller 80 performs a recording processing. In the recording processing, the controller 80 is configured to repeatedly perform the recording pass and the conveying operation as described above to perform the recording on the recording sheet P. In addition, in a case where the recording pass is performed in the recording processing, the controller 80 causes only the nozzles 10 forming the nozzle row 9 that is not set to non-use to eject the ink.

In the fifth embodiment, by performing the processing with reference to the flow shown in FIGS. 14A and 14B, in the monochrome mode, in a case where the number of abnormal nozzles in all of the nozzle rows 9 is less than the predetermined number, the recording is performed by ejecting the ink from the nozzles 10 forming the four nozzle rows 9. In addition, in the monochrome mode, in a case where there are nozzle rows 9 in which the number of abnormal nozzles is equal to or greater than the predetermined number, the recording is performed by ejecting the ink only from the nozzles 10 forming a part of the four nozzle rows 9. On the other hand, in the color mode, the recording is performed by ejecting the ink from the nozzles 10 forming the four nozzle rows 9, regardless of the number of abnormal nozzles in each nozzle row 9.

<Effects>

In the fifth embodiment, in the printer configured to selectively perform the recording in either the monochrome mode in which the recording is performed by ejecting black ink from all the nozzles forming the four nozzle rows 9 or the color mode in which the recording is performed by ejecting ink of different colors from the nozzles forming the four nozzle rows 9, in a case where the recording is performed in the monochrome mode, when the number of abnormal nozzles among the first nozzles is less than the first predetermined number and the number of abnormal nozzles among the second nozzles is less than the second predetermined number, the recording can be performed, with a high resolution in the scanning direction, by driving the ink jet head 4 such that the ink is ejected from both the first nozzles and the second nozzles.

In a case where the number of abnormal nozzles among the first nozzles is equal to or greater than the first predetermined number and the number of abnormal nozzles among the second nozzles is less than the second predetermined number, the recording is performed by driving the ink jet head 4 such that the ink is not ejected from the first nozzles and the ink is ejected from the second nozzles. As a result, the recording can be performed with a lower resolution in the scanning direction.

In this case, in a case where the number of abnormal nozzles among the first nozzles is equal to or greater than the first predetermined number, the recording can be performed with a lower resolution in the scanning direction with a simple processing. In this case, since the image quality of the recorded image is uniformly lowered, as compared with the case where the image quality of the recorded image is partially lowered by performing the recording without lowering the resolution in the scanning direction and not ejecting the ink from the abnormal nozzle, the degradation in image quality is less noticeable.

In a case where the recording is performed in the color mode, the recording is performed by ejecting the ink from the nozzles 10 forming all of the nozzle rows 9, regardless of the number of abnormal nozzles in each nozzle row 9. Since ink of different colors are ejected from the nozzles 10 forming the four nozzle rows 9 in the color mode, in a case where ink is not ejected from only the nozzles 10 that eject a specific color of ink, there is a concern that the image quality may be greatly deteriorated compared to when ink is not ejected from the nozzles 10 forming a part of the nozzle rows 9 in the monochrome mode. Therefore, in the case of the color mode, even in a case where the number of abnormal nozzles in the nozzle row 9 is large, it is desirable to perform the recording by ejecting the ink from the nozzles 10 forming the nozzle row 9.

Sixth Embodiment

Figure 15A:
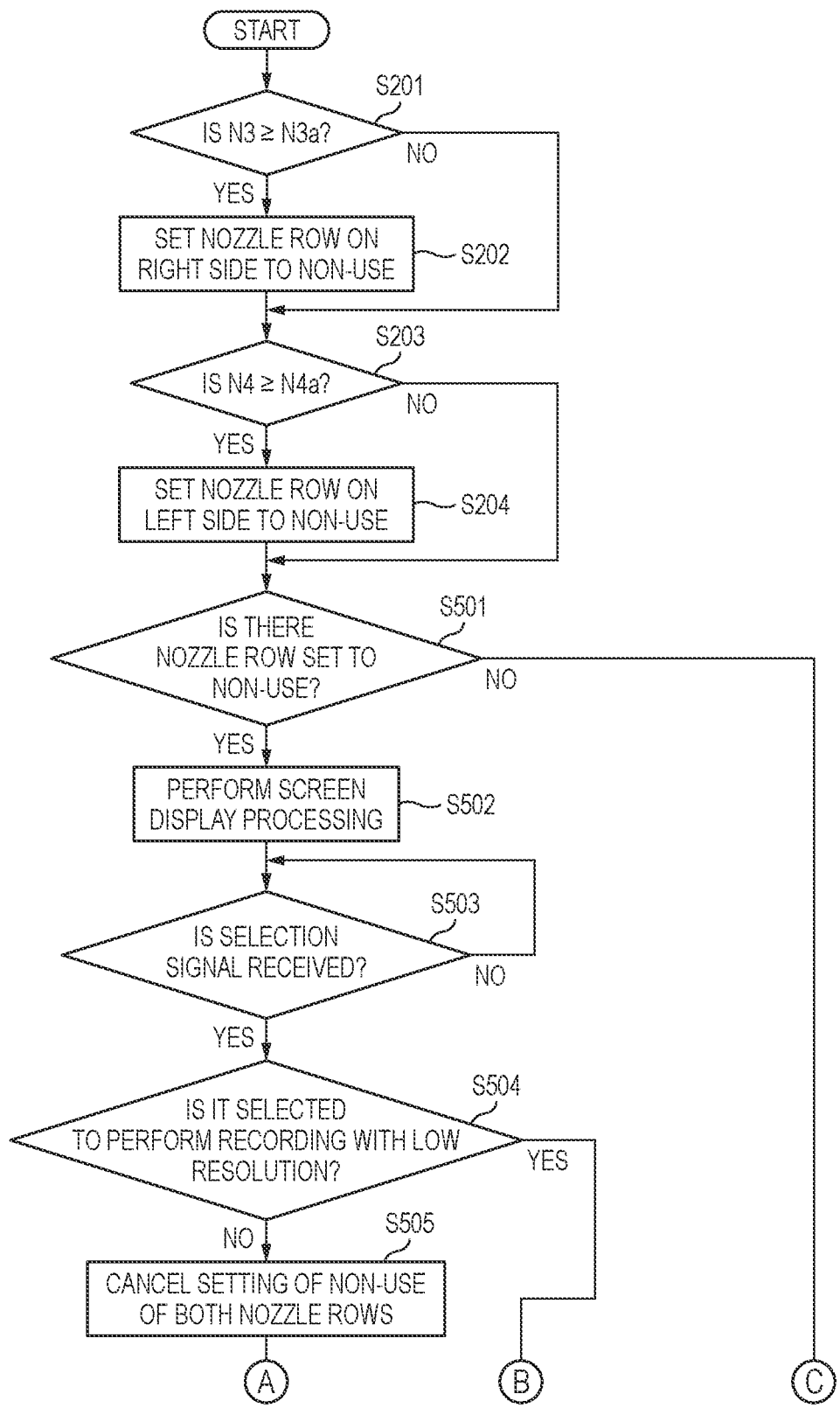
FIG. 15A is a flowchart illustrating a flow of processing in a case where recording is performed in a printer according to a sixth embodiment.
Figure 15B:
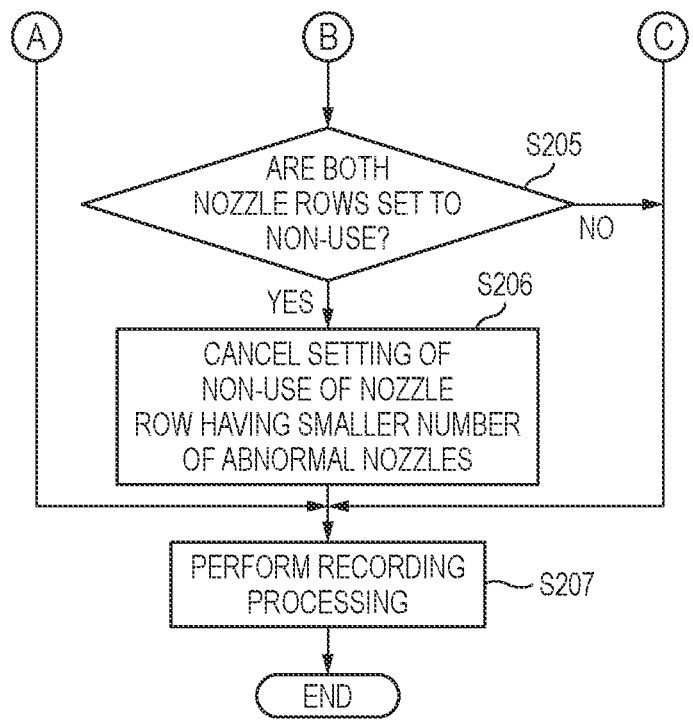
FIG. 15B is the flowchart illustrating the flow of processing in a case where recording is performed in a printer according to a sixth embodiment.

Next, a preferred sixth embodiment of the present disclosure will be described. The sixth embodiment relates to the printer 200 similar to the second embodiment or the printer 300 similar to the third embodiment. In the sixth embodiment, in a case where recording is performed in the printer 1, the controller 80 performs processing with reference to a flow shown in FIGS. 15A and 15B.

More specifically, the controller 80 is configured to perform the processing of step S201 to step S204 as described in the second embodiment. After the processing of step S204, the controller 80 determines whether there is a nozzle row 109 set to non-use (step S501).

Figure 16:
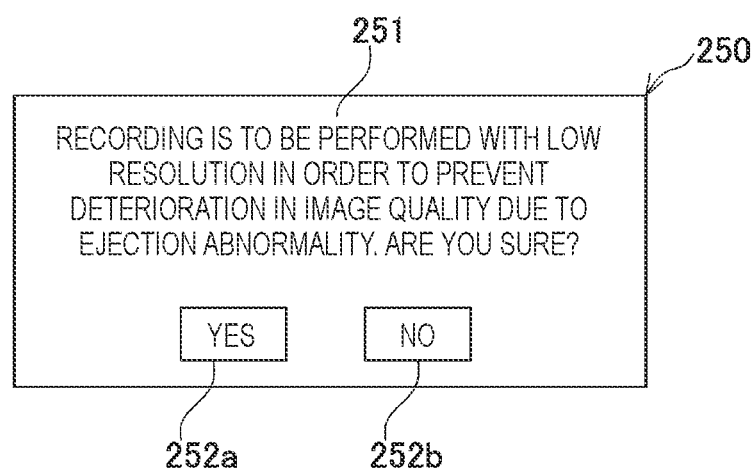
FIG. 16 is a diagram illustrating a display screen displayed in the sixth embodiment.

In a case where there is no nozzle row 109 set to non-use (NO in step S501), the controller 80 performs the recording processing of step S207 as described in the second embodiment, and ends the processing. In a case where there is a nozzle row 109 set to non-use (YES in step S501), the controller 80 performs screen display processing (step S502). In the screen display processing, the controller 80 causes the display unit 69 to display a selection screen 250 as illustrated in FIG. 16. The selection screen 250 includes a message portion 251 ("first object" of the present disclosure) and selection portions 252a and 252b ("second object" of the present disclosure).

The message portion 251 is a portion where a message for notifying the user that recording is to be performed with a low resolution in order to prevent deterioration in image quality due to an ejection abnormality and for prompting the user to select whether to perform the recording with a low resolution is displayed. The selection portions 252a and 252b are portions in which the user select whether to record with a low resolution by operating the portions. In a case where the user operates the operation unit 68 based on the selection portion 252a, a selection signal indicating that the recording is to be performed with a low resolution is input. In a case where the user operates the operation unit 68 based on the selection portion 252b, a selection signal indicating that the recording is not performed with a low resolution is input. Here, operating the operation unit 68 based on the selection portions 252a and 252b means, for example, operating buttons corresponding to the selection portions 252a and 252b in a case where the operation unit 68 is a button, or touching a portion of a touch panel on which the selection portions 252a and 252b are displayed in a case where the operation unit 68 is the touch panel provided on the display unit 69.

Returning to FIGS. 15A and 15B, after the selection screen display processing in step S502, the controller 80 is configured to wait until a selection signal is received (NO in step S503). In a case where the controller 80 receives the selection signal (YES in step S503), the controller 80 determines whether it is selected to perform the recording with a low resolution (step S504), based on the received selection signal.

In a case where it is selected to perform the recording with a low resolution (YES in step S504), the controller 80 performs the processing of step S205 to step S207 as described in the second embodiment. In a case where it is selected not to perform the recording with a low resolution (NO in step S504), the controller 80 cancels a setting of non-use of the nozzle row 9 set in at least one of step S202 and step S204 (step S505), and the processing proceeds to the recording processing of step S207. In this case, in the recording processing of step S207, the ink is ejected from the nozzles 10 forming both of the two nozzle rows 109.

<Effects>

In the sixth embodiment, in a case where the number of abnormal nozzles in any of the nozzle rows 109 is large and the recording is performed with a low resolution by setting the nozzle row 109 to non-use, the selection screen 250 including the message portion 251 is displayed on the display unit 69. As a result, the user can grasp that the recording is performed with a lower resolution.

In the sixth embodiment, in this case, the selection screen 250 including the message portion 251 and the selection portions 252a and 252b is displayed on the display unit 69. Thus, in a case where the number of abnormal nozzles in any one of the nozzle rows 109 is equal to or greater than the predetermined number, the user can select whether to perform the recording with a lower resolution, and the recording can be performed with a lower resolution only when the user selects to perform the recording with a lower resolution.

On the other hand, in a case where the user selects not to perform the recording with a lower resolution, it is possible to perform the recording with a high resolution by ejecting the ink from the nozzles 10 forming both the nozzle rows 109 according to a preference of the user.

In the sixth embodiment, although an example has been described in which the selection screen 250 is displayed on the display unit 69 to allow the user to select whether to perform the recording with a lower resolution in the second and third embodiments, the selection screen 250 may be displayed on the display unit 69 to allow the user to select whether to perform the recording with a lower resolution in the first and fourth embodiments.

[Modification]

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the first to sixth embodiments, in a case where the recording is performed with a lower resolution, the size of the dots is increased by increasing the amount of ink ejected from the nozzles 10 compared to a case where the resolution is not lowered, but the present invention is not limited thereto. In the case where the recording is performed with a lower resolution, the amount of ink ejected from the nozzles 10 may be the same as that in the case where the resolution is not lowered.

In the first embodiment, the low resolution set in advance is uniformly lower than an original resolution regardless of a portion of the recorded image, but the present invention is not limited thereto. The low resolution set in advance may vary depending on the position, in the conveying direction, of the recorded image. For example, in the conveying direction, among the plurality of dots D formed in a case where the recording is performed by the first recording processing, control may be performed such that two consecutive dots are formed and the next two consecutive dots are thinned out, or control may be performed such that, for example, three consecutive dots are formed and the next three consecutive dots are thinned out, instead of forming every other dot D.

In the first embodiment, in a case where the number N2 of abnormal nozzles cannot be made less than the predetermined number Na even when the recording is performed with the low resolution set in advance, the first recording processing is performed after the suction purge is performed, but the present invention is not limited thereto. For example, in such a case, a message prompting to perform the suction purge may be displayed on the display unit 69 without performing the recording.

In the second and third embodiments, in a case where the number N3 of abnormal nozzles is equal to or greater than the predetermined number N3$a$ and the number N4 of abnormal nozzles is equal to or greater than the predetermined number N4$a$, the recording is performed by ejecting the ink only from the nozzles 10 forming the nozzle row 109 having a smaller number of abnormal nozzles among the two nozzle rows 109, but the present invention is not limited thereto.

In the second and third embodiments, in a case where the number N3 of abnormal nozzles is equal to or greater than the predetermined number N3$a$ and the number N4 of abnormal nozzles is equal to or greater than the predetermined number N4$a$, the recording may be performed by ejecting the ink only from the nozzles 10 forming the nozzle row 109 on the right side, regardless of a magnitude relation between the number N3 of abnormal nozzles and the number N4 of abnormal nozzles. Alternatively, the recording may be performed by ejecting the ink only from the nozzles 10 forming the nozzle row 109 on the left side, regardless of the magnitude relation between the number N3 of abnormal nozzles and the number N4 of abnormal nozzles.

Alternatively, in the second and third embodiments, in a case where the number N3 of abnormal nozzles is equal to or greater than the predetermined number N3$a$ and the number N4 of abnormal nozzles is equal to or greater than the predetermined number N4$a$, the suction purge may be performed, the setting of non-use of both of the nozzle rows 109 may be canceled, and then the processing may proceed to the recording processing of step S207.

In the second and third embodiments, the ink is supplied, from different ink cartridges 114, to the plurality of nozzles 10 forming the nozzle row 109 on the right side and the plurality of nozzles 10 forming the nozzle row 109 on the left side. However, the present invention is not limited thereto. For example, the ink may be supplied from a common ink cartridge 114 to the plurality of nozzles 10 forming the two nozzle rows 109.

In the above example, the ink is supplied to the nozzles 10 from the detachably mounted ink cartridge, but the present invention is not limited thereto. For example, the printer may be provided not to be detachable, an ink tank having an ink replenishment port may be provided, and ink stored in the ink tank may be supplied to each nozzle 10.

In the second and third embodiments, the plurality of first driving elements 120$a$ are driven by the first driver IC 130$a$, and the plurality of second driving elements 120$b$ are driven by the second driver IC 130$b$ different from the first driver IC 130$a$, but the present invention is not limited thereto. For example, the plurality of first driving elements 120$a$ and the plurality of second driving elements 120$b$ may be driven by a common driver IC.

In the second embodiment, the ink jet head 4 has two nozzle rows 109, and, between the two nozzle rows 109, the positions, in the conveying direction, of the nozzles 10 are shifted by half the length of the interval Lb between the nozzles 10 in each nozzle row 109, but the present invention is not limited thereto. For example, assuming that M is an integer of three or more, the ink jet head may have M nozzle rows 109, and positions, in the conveying direction, of the nozzles 10 may be shifted between the nozzle rows 109 by a length (Lb/M) of 1/M of the interval Lb of the nozzles 10 in each nozzle row 109.

In the fifth embodiment, the positions, in the conveying direction, of the nozzles 10 in the four nozzle rows 9 are the same, but the present invention is not limited thereto. In the fifth embodiment, the positions, in the conveying direction, of the nozzles 10 in at least a part of the four nozzle rows 9 may be shifted.

In addition, in the fifth embodiment, in a case where all of the four nozzle rows 9 are set to non-use, the recording is performed by canceling the setting of non-use of one nozzle row 9 having the smallest number of abnormal nozzles, but the present invention is not limited thereto. For example, in a case where all of the four nozzle rows 9 are set to non-use, the recording may be performed by canceling the setting of non-use in two nozzle rows 9 including the nozzle row 9 having the smallest number of abnormal nozzles and a nozzle row 9 having the second smallest number of abnormal nozzles. Alternatively, for example, in a case where all of the four nozzle rows 9 are set to non-use, the recording may be performed by canceling the setting of non-use of three nozzle rows 9 other than a nozzle row 9 having the largest number of abnormal nozzles.

In the sixth embodiment, in a case where any one of the nozzle rows 9 is set to non-use and the user selects not to perform the recording with a lower resolution, the setting of non-use of the nozzle row 9 is canceled, and the recording is performed by ejecting the ink from the plurality of nozzles 10 forming both of the nozzle rows 9 in a state where at least the number N3 of abnormal nozzles is equal to or greater than the predetermined number N3a or the number N4 of abnormal nozzles is equal to or greater than the predetermined number N4a, but the present invention is not limited thereto.

For example, in a case where any one of the nozzle rows 9 is set to non-use and the user selects not to perform the recording with a lower resolution, the recording may be performed by ejecting the ink from the plurality of nozzles 10 forming both of the nozzle rows 9 after the suction purge is performed. Alternatively, in such a case, the recording may be stopped and a message prompting to perform the suction purge may be displayed on the display unit 69.

In the sixth embodiment, the selection screen 250 including the message portion 251 and the selection portions 252a and 252b is displayed on the display unit 69, but the present invention is not limited thereto. For example, instead of the selection screen 250, a screen including only a message for notifying the user that the recording is to be performed with a lower resolution may be displayed on the display unit 69. In this case as well, the user can grasp that the recording is performed with a lower resolution based on this screen.

The screen as described above is not limited to being displayed on the display unit of the printer. For example, in a case where the printer is connected to an external device such as a PC or a smartphone, a screen as described above may be displayed on a display unit of the external device. In this case, for example, the controller 80 may transmit a signal for displaying the screen to the external device instead of performing processing of displaying the screen on the display unit 69.

The recording may be performed with a lower resolution without displaying the screen as described above on the display unit.

In the above example, the resolution, in the conveying direction or the scanning direction, of the recorded image in the second recording processing is set to be lower than that in the first recording processing, but the present invention is not limited thereto.

For example, in the second recording processing of the first and second embodiments, a conveyance amount of the recording sheet P in the conveying operation is set to be smaller than that in the first recording processing, and the ink ejection corresponding to one recording pass in the first recording processing among the recording data is performed in a plurality of recording passes separately, and thus the resolution, in the conveying direction, of the recorded image may be the same as that in the case where the recording is performed by the first recording processing. In this case, in the second recording processing, since the ink ejection corresponding to one recording pass in the first recording processing among the recording data is only performed in a plurality of recording passes separately, the recording can be performed by directly using the recording data used in the first recording processing. Therefore, processing of changing from the first recording processing to the second recording processing is not complicated. That is, the control can be simplified. In the fourth and sixth embodiments, even in the second recording processing in a case where the positions, in the conveying direction, of the nozzles 10 are shifted between the two nozzle rows 109, the recording may be performed in the same manner as described above.

For example, in the second recording processing of the third embodiment, in the recording pass, a movement speed of the carriage 2 may be set to half a speed in the first recording processing, and ink ejection, from the nozzles 10 forming the one of the nozzle rows 109, based on a data portion corresponding to one of the nozzle rows 109 in the recording and based on a data portion corresponding to the other of the nozzle rows 109 in the recording data may be alternately performed. In this case, the resolution, in the scanning direction, of the image recorded in the second recording processing is the same as that in the case where the recording is performed by the first recording processing. In this case, in the second recording processing, since the recording can be performed by directly using the recording data used in the first recording processing, the processing of changing from the first recording processing to the second recording processing is not complicated. That is, the control can be simplified. In the second recording processing in a case where the positions, in the conveying direction, of the nozzles 10 are the same between the two nozzle rows 109 in the fourth and sixth embodiments, and in the second recording processing in the fifth embodiment, the recording may be performed in the same manner as described above.

In the above example, it is determined whether the nozzle 10 is an abnormal nozzle, based on the signal output from the signal processing circuit 78 according to a change in voltage from the nozzle 10 to the electrode 76 disposed inside the cap 71 in a case where the ink jet head 4 is caused to perform the test drive, but the present invention is not limited thereto.

For example, instead of the electrode 76, an electrode that extends in the vertical direction and faces a space below the nozzle 10 in a state where the carriage 2 is positioned at the maintenance position may be provided. The signal processing circuit 78 may be configured to output a signal corresponding to the change in voltage of the above-mentioned electrode in a case where the test drive is performed in the state where the carriage 2 is positioned at the maintenance position.

Alternatively, for example, an optical sensor configured to directly detect the ink ejected from the nozzles 10 in the state where the carriage 2 is positioned at a predetermined position such as the maintenance position and configured to output a signal corresponding to a detection result may be provided. Whether the nozzle 10 is an abnormal nozzle may be determined based on the signal output from the optical sensor.

Alternatively, for example, similar to that described in JP 4929699 B2, a voltage detection circuit configured to detect a change in voltage in a case where ink is ejected from a nozzle may be connected to a plate in which the nozzle of an ink jet head is formed, and whether the nozzle is an abnormal nozzle may be determined based on a signal output from the voltage detection circuit in a case where an operation for ejecting the ink from the nozzle is performed in a state where a carriage is moved to a test position.

Alternatively, for example, similar to that described in JP 6231759 B2, a substrate of an ink jet head may include a temperature detection element. After a heater is driven by applying a first applied voltage for ink ejection, the heater may be driven by applying a second applied voltage such that the ink is not ejected, and a signal corresponding to whether the nozzle 10 is an abnormal nozzle may be output, based on a change in temperature detected by the temperature detection element until a predetermined time elapses after the second applied voltage is applied.

Alternatively, a predetermined test pattern may be recorded in the printer, and whether each nozzle 10 is an abnormal nozzle may be determined based on a recording result of the test pattern. In this case, in a case where the printer is a multi function device having a scanner, the recording result of the test pattern may be input by causing the scanner to read the test pattern. Alternatively, the user may input the recording result of the test pattern by operating the operation unit 68 or an external device connected to the printer, based on the recording result of the test pattern.

In the above example, the test drive is performed for all the nozzles 10 of the ink jet head 4 to determine whether the nozzles 10 are abnormal nozzles, but the present invention is not limited thereto. For example, it may be determined whether the nozzle 10 is an abnormal nozzle by performing the test drive only for a part of nozzles 10 of the ink jet head 4, such as every other nozzle 10 in each nozzle row 9. Then, for other nozzles 10, it may be estimated whether the nozzle 10 is an abnormal nozzle based on a determination result for the part of the nozzles 10.

In the above example, it is determined whether the nozzle 10 is an abnormal nozzle based on whether the ink is ejected from the nozzle 10, but the present invention is not limited thereto. For example, it may be determined whether the nozzle 10 is an abnormal nozzle based on an ejection direction or an ejection speed of the ink.

In the above example, as the abnormal nozzle information, information as to whether each of the plurality of nozzles 10 is an abnormal nozzle is stored in the flash memory 84, but other information related to whether there are abnormal nozzles having a predetermined number or more of abnormal nozzles may be stored in the flash memory 84, as the abnormal nozzle information. For example, information on the number of abnormal nozzles may be stored in the flash memory 84, as the abnormal nozzle information. In addition, for example, in each embodiment, in a case where all the predetermined numbers are one, information on whether at least one nozzle 10 is an abnormal nozzle may be stored in the flash memory 84, as the abnormal nozzle information.

In the above-described embodiment, an example in which the present disclosure is applied to a printer including a so-called serial head configured to eject ink from a plurality of nozzles while moving in the scanning direction together with a carriage has been described, but the present invention is not limited thereto. For example, the present disclosure can be applied to a printer including a so-called line head having a plurality of nozzles extending over the entire length of a recording sheet in the scanning direction ("first direction" of the present disclosure) and arranged in the scanning direction. In the printer including the line head, recording is performed by ejecting ink from a plurality of nozzles of the line head while relatively moving the line head, with respect to the recording sheet, in the conveying direction by conveying the recording sheet in the conveying direction ("second direction" of the present disclosure) by a sheet conveying mechanism such as a conveying roller. That is, in a case where the present disclosure is applied to the printer including the line head, the sheet conveying mechanism corresponds to the "relative movement unit" of the present disclosure.

As described above, an example in which the present disclosure is applied to an external device configured to communicate with a printer configured to perform recording on a recording sheet P by ejecting ink from nozzles has been described, but the present invention is not limited thereto. The present disclosure can also be applied to a printer configured to record an image on a recording medium other than a recording sheet, such as a T-shirt, a sheet for outdoor advertisement, a case of a mobile terminal such as a smartphone, a corrugated board, and a resin member.

What is claimed is:

1. A recording device comprising:
a head including a plurality of nozzles that are arranged at predetermined intervals in a first direction, the plurality of nozzles being configured to eject liquid;
a relative movement unit configured to relatively move the head, with respect to a recording medium, in a second direction intersecting the first direction;
a storage unit configured to store abnormal nozzle information related to whether a number of abnormal nozzles among the plurality of nozzles is equal to or greater than a predetermined number, the abnormal nozzles having an abnormality in liquid ejection; and
a controller,
wherein, in response to receiving a recording instruction signal instructing to perform recording on the recording medium, the controller is configured to:
in a case where the abnormal nozzle information indicates that the number of the abnormal nozzles among the plurality of nozzles is less than the predetermined number, perform a first recording processing of causing the head to eject liquid from the plurality of nozzles while causing the relative movement unit to move the head, with respect to the recording medium, in the second direction to record an image on the recording medium with a resolution in which a resolution in the first direction corresponds to the predetermined interval; and
in a case where the abnormal nozzle information indicates that the number of the abnormal nozzles among the plurality of nozzles is equal to or greater than the predetermined number and indicates that the number of the abnormal nozzles, among a part of the plurality of nozzles in which an interval in the first direction is a preset interval longer than the predetermined interval, is less than the predetermined number, perform a second recording processing of causing the head to eject liquid from the part of nozzles while causing the relative movement unit to move the head, with respect to the recording medium, in the second direction to record an image on the recording medium with a resolution in which a resolution in the first direction is lower than a resolution corresponding to the predetermined interval.

2. The recording device according to claim 1,
wherein, in the second recording processing, the controller is further configured to:
record an image having, in the first direction or the second direction, a lower resolution than a resolution of an image recorded in the first recording processing; and
cause the head to eject a larger amount of liquid from the nozzles to form one dot than an amount of liquid ejected from the nozzles to form one dot in the first recording processing.

3. A recording device comprising:
a head including:
a plurality of first nozzles that are arranged in a first direction, the plurality of first nozzles being configured to eject liquid supplied from a first flow path connected to a liquid storage portion configured to store the liquid; and
a plurality of second nozzles that are arranged in the first direction, the plurality of second nozzles being configured to eject liquid supplied from a second flow path connected to the liquid storage portion, the second flow path being different from the first flow path;
a relative movement unit configured to relatively move the head, with respect to a recording medium, in a second direction intersecting the first direction;
a storage unit configured to store abnormal nozzle information related to whether a number of abnormal nozzles among the plurality of first nozzles is equal to or greater than a first predetermined number, the abnormal nozzles having an abnormality in liquid ejection, and whether the number of the abnormal nozzles among the plurality of second nozzles is equal to or greater than a second predetermined number, and
a controller,
wherein, in response to receiving a recording instruction signal instructing to perform recording on the recording medium, the controller is configured to:
in a case where the abnormal nozzle information indicates that the number of the abnormal nozzles among the plurality of first nozzles is less than the first predetermined number and the number of the abnormal nozzles among the plurality of second nozzles is less than the second predetermined number, perform a first recording processing of causing the head to eject liquid from the plurality of first nozzles and to eject liquid from the plurality of second nozzles to perform recording on the recording medium, while causing the relative movement unit to relatively move the head, with respect to the recording medium, in the second direction; and
in a case where the abnormal nozzle information indicates that the number of the abnormal nozzles among the plurality of first nozzles is equal to or greater than the first predetermined number and the number of the abnormal nozzles among the plurality of second nozzles is less than the second predetermined number, perform a second recording processing of causing the head not to eject liquid from the plurality of first nozzles and to eject liquid from the plurality of second nozzles to perform recording on the recording medium, while causing the relative movement unit to relatively move the head, with respect to the recording medium, in the second direction.

4. The recording device according to claim 3,
wherein the liquid storage portion includes:
a first liquid storage portion connected to the first flow path; and
a second liquid storage portion connected to the second flow path, the second liquid storage portion being different from the first liquid storage portion.

5. The recording device according to claim 3,
wherein the head includes:
a plurality of first elements that are individually provided for the plurality of first nozzles, the plurality of first elements being configured to apply ejection energy to liquid in the first nozzles; and
a plurality of second elements that are individually provided for the plurality of second nozzles, the plurality of second elements being configured to apply ejection energy to liquid in the second nozzles, and
the recording device further includes:
a first driving signal output unit connected to the plurality of first elements, the first driving signal output unit being configured to output a driving signal to the plurality of first elements; and
a second driving signal output unit connected to the plurality of second elements, the second driving signal output unit being configured to output a driving signal to the plurality of second elements.

6. A recording device according to claim 3,
wherein, in a case where the abnormal nozzle information indicates that the number of the abnormal nozzles among the plurality of first nozzles is equal to or greater than the first predetermined number and indicates that the number of the abnormal nozzles among the plurality of second nozzles is equal to or greater than the second predetermined number, the controller is further configured to perform a third recording processing of causing the head to eject a liquid from nozzles, among the plurality of first nozzles and the plurality of second nozzles, having a smaller number of the abnormal nozzles, and causing the head not to eject a liquid from nozzles, among the plurality of first nozzles and the plurality of second nozzles, having a greater number of abnormal nozzles, while causing the relative movement unit to relatively move the head, with respect to the recording medium, in the second direction.

7. The recording device according to claim 3,
wherein, in response to receiving the recording instruction signal, the controller is further configured to:
acquire recording data for recording an image;
perform the first recording processing, in a case where the abnormal nozzle information indicates that the number of the abnormal nozzles, among the first nozzles used in a case where the liquid is ejected from the plurality of first nozzles based on the recording data, is less than the first predetermined number, and indicates that the number of the abnormal nozzles, among the second nozzles used in a case where the liquid is ejected from the plurality of second nozzles based on the recording data, is less than the second predetermined number, and
perform the second recording processing, in a case where the abnormal nozzle information indicates that the number of the abnormal nozzles, among the first nozzles used in a case where the liquid is ejected from the plurality of first nozzles based on the recording data, is equal to or greater than the first predetermined number, and indicates that the number of the abnormal nozzles, among the second nozzles used in a case where the liquid is ejected from the plurality of second nozzles based on the recording data, is less than the second predetermined number.

8. The recording device according to claim 3,
wherein each of the plurality of first nozzles is arranged at a predetermined interval in the first direction,
each of the plurality of second nozzles is arranged at a predetermined interval in the first direction, and
the plurality of first nozzles and the plurality of second nozzles are arranged to be shifted, in the first direction, by a length shorter than the predetermined interval.

9. The recording device according to claim 8,
wherein the plurality of first nozzles and the plurality of second nozzles are arranged to be shifted, in the first direction, by a length of half the predetermined interval.

10. The recording device according to claim 3,
wherein the plurality of first nozzles and the plurality of second nozzles are in the same position in the first direction.

11. The recording device according to claim 3,
wherein the head further includes:
a plurality of third nozzles that are arranged in the first direction, the plurality of third nozzles being configured to eject liquid supplied from a third flow path connected to the liquid storage portion configured to store liquid; and
a plurality of fourth nozzles that are arranged in the first direction, the plurality of fourth nozzles being configured to eject liquid supplied from a fourth flow path connected to the liquid storage portion configured to store liquid,
the liquid storage portion includes:
a first liquid storage portion connected to the first flow path;
a second liquid storage portion connected to the second flow path;
a third liquid storage portion connected to the third flow path; and
a fourth liquid storage portion connected to the fourth flow path,
the recording device is configured to perform recording in any one of a monochrome mode and a color mode,
in the monochrome mode, the first to fourth liquid storage portions are configured to supply black ink to the first to fourth nozzles, and the plurality of first to fourth nozzles are configured to eject the black ink to perform recording,
in the color mode, the first liquid storage portion is configured to supply the black ink to the first nozzle, the second to fourth liquid storage portions are configured to supply respective color ink of different colors to the second to fourth nozzles, the plurality of first nozzles is configured to eject the black ink, and the plurality of second to fourth nozzles are configured to eject the color ink, to perform recording,
in a case where the controller performs the recording in the monochrome mode, the controller is configured to:
perform the first recording processing, in a case where the abnormal nozzle information indicates that the number of the abnormal nozzles among the plurality of first nozzles is less than the first predetermined number, and indicates that the number of the abnormal nozzles among the plurality of second nozzles is less than the second predetermined number; and
perform the second recording processing, in a case where the abnormal nozzle information indicates that the number of the abnormal nozzles among the plurality of first nozzles is equal to or greater than the first predetermined number, and indicates that the number of the abnormal nozzles among the plurality of second nozzles is less than the second predetermined number, and
in a case where the controller performs the recording in the color mode, the controller is configured to:
perform the first recording processing, regardless of the number of the abnormal nozzles among the plurality of first nozzles and the number of the abnormal nozzles among the plurality of second nozzles, which are indicated by the abnormal nozzle information.

12. The recording device according to claim 3,
wherein, in the second recording processing, the controller is further configured to:
record an image having, in the first direction or the second direction, a lower resolution than a resolution of an image recorded in the first recording processing; and
cause the head to eject a larger amount of liquid from the nozzles to form one dot than an amount of liquid ejected from the nozzles to form one dot in the first recording processing.

13. The recording device according to claim 2, further comprising:
a display unit,
wherein the controller is further configured to cause the display unit to display a first object, in a case where the abnormal nozzle information indicates that the number of the abnormal nozzles among the plurality of first nozzles is equal to or greater than the first predetermined number and indicates that the number of the abnormal nozzles among the plurality of second nozzles is less than the second predetermined number, the first object indicating that the second recording processing is to be performed.

14. The recording device according to claim 13,
wherein the controller is further configured to:
cause the display unit to display a second object together with the first object, a user selecting whether to perform the second recording processing by operating the second object, and
perform the second recording processing, in a case where the controller receives a selection signal, generated by an operation of the second object by the user, indicating that the user determines to perform the second recording processing.

15. The recording device according to claim 14,
wherein the controller is further configured to perform the first recording processing, in a case where the controller receives the selection signal, generated by an operation of the second object by the user, indicating that user determines not to perform the second recording processing based on the second object is received from the user.

* * * * *